US00RE35329E

United States Patent [19]

Murakami et al.

[11] E Patent Number: Re. 35,329

[45] Reissued Date of Patent: Sep. 17, 1996

[54] ELECTRONIC BLACKBOARD AND ACCESSORIES SUCH AS WRITING TOOLS

[75] Inventors: Azuma Murakami, Kanagawa-ken; Kazuo Aoki, Saitama-ken; Tsuguya Yamanami, Saitama-ken; Yoshiaki Tomofuji, Saitama-ken; Takeshi Tanaka, Saitama-ken; Satoshi Inashima, Saitama-ken; Takahiko Funahashi, Saitama-ken; Toshihide Chikami, Saitama-ken; Toshiaki Senda, Saitama-ken, all of Japan

[73] Assignee: Wacom Co., Ltd., Saitama-ken, Japan

[21] Appl. No.: 74,569

[22] Filed: Jun. 10, 1993

Related U.S. Patent Documents

Reissue of:

[64] Patent No.: 5,023,408
Issued: Jun. 11, 1991
Appl. No.: 365,388
Filed: Jun. 13, 1989

[30] Foreign Application Priority Data

Jun. 22, 1988 [JP] Japan ..... 63-154518

[51] Int. Cl.[6] ..... G08C 21/00

[52] U.S. Cl. ..... 178/19; 178/18; 345/157

[58] Field of Search ..... 178/18, 19; 345/157, 345/179, 173; 341/5

[56] References Cited

U.S. PATENT DOCUMENTS

| | | | |
|---|---|---|---|
| 2,812,427 | 11/1957 | Magondeaux . | |
| 2,899,596 | 8/1959 | Hollman . | |
| 2,958,781 | 11/1960 | Marchal et al. . | |
| 3,117,277 | 1/1964 | Magondeaux . | |
| 3,373,425 | 3/1968 | Barischoff . | |
| 4,479,032 | 10/1984 | Parnell | 178/19 |
| 4,672,154 | 6/1987 | Rodgers et al. | 178/19 |
| 4,697,050 | 9/1987 | Farel et al. | 178/19 X |
| 4,711,977 | 12/1987 | Miyamori et al. | 178/18 |
| 4,786,765 | 11/1988 | Yamanami et al. | 178/19 |
| 4,848,496 | 7/1989 | Murakami et al. | 178/19 |
| 4,878,553 | 11/1989 | Yamanami et al. | 178/18 |
| 4,902,858 | 2/1990 | Yamanami et al. | 178/19 |

*Primary Examiner*—Stephen Chin
*Assistant Examiner*—Paul Loomis
*Attorney, Agent, or Firm*—Lowe, Price, LeBlanc & Becker

[57] ABSTRACT

A characteristic and the position of an implement with a tuned circuit having one of plural resonant frequencies are determined. AC energy at the plural different resonant frequencies is supplied to a two-coordinate direction coil arrangement of a position sensing tablet. The tuned circuit changes the current flowing in the coil arrangement at the implement resonant frequency. The current change is used to signal the implement position and characteristic. The implement may be an eraser for supplying a signal to an electronic display and for removing a mark from a surface of a visual display overlaying the tablet of the eraser. A housing includes a surface for erasing the marking and two tuned circuits each having a reactance positioned close to opposite edges of the erasing surface. Two switches, when activated, cause the tuned circuits to have different resonant frequencies. The switches are respectively activated when opposite eraser edges are being pushed against the display surface. The implement may also be one of a plurality of markers, each for a different color. Another display responds to the signals to display the position and colors of the markings and selectively remove markings from areas corresponding to the eraser position.

90 Claims, 15 Drawing Sheets

ELECTRONIC BLACKBOARD AND ACCESSORIES SUCH AS WRITING TOOLS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an electronic blackboard for processing image information which corresponds to the image or the like displayed on the writing surface and its accessories such as writing tools.

2. Prior Art

Hitherto, there is a conventional electronic blackboard apparatus (called "an electromagnetic coupled type" hereinafter) arranged such that a multiplicity of sensing lines are, in both x and y directions, formed on the reverse side of the writing surface thereof and a writing tool comprising a felt pen or the like is provided with a coil as to generate flux change when an electronic current is passed so that the thus-generated flux change is detected by the sensing lines or the other end of the coil so that the position of the writing tool on the writing surface is detected and thereby image information which corresponds to the image displayed on the writing surface can be processed.

Another type of the electronic blackboard apparatus called "a photoelectric transfer type" hereinafter) is known which is arranged such that an image written on a whiteboard or a flexible seat with a writing tool such as a felt pen or the like is scanned by a scanner which can move along the surface of this whiteboard or by a stationary scanner with this seat wound up as to be photoelectrically transferred to image information.

The other conventional electronic blackboard apparatus (called "a pressure sensing type" hereinafter) is known in which two resistance plates provided with electrodes on the opposing sides thereof are fastened to the reverse side of a writing surface made of a flexible material. The various parts are laminated to each other. These two resistance plates are fastened to the electrodes in such a manner that these electrodes are positioned in the vertical or lateral direction. Therefore, a displacement current is generated between an electrode on one resistance plate and the electrode on the other resistance plate when the writing tool is moved along the surface of the writing surface with an electric current being passed through either of the two resistance plates. On the basis of the thus-generated displacement current, the position of the writing tool on the writing surface is detected so that image information corresponding to the image displayed on the writing surface is processed.

However, the above-described electromagnetic coupling type apparatus has a problem in that, a cord needs to be provided between the control unit for detecting position and a coil provided for the writing tool. The thus-provided cord readily deteriorates in handling the writing tool.

In the photoelectrically transfer type apparatus, the writing tool can be arranged to be a cord-less type. However, another problem arises in that information corresponding to the displayed image cannot be obtained during writing of the image on the writing surface, that is a real-time image cannot be obtained since image information can be first obtained when the scanner is moved or the seat is wound up.

In the pressure sensing type apparatus, the writing tool can be arranged to be a cord-less type and the information corresponding to the image which is being written can be obtained. However, a problem arises in that the thickness and the weight become excessive since the structure needs to be formed to withstand the pressure applied with the writing tool to the writing surface.

SUMMARY OF THE INVENTION

A first object of the present invention is to provide an electronic blackboard apparatus capable of using a cordless accessary such as an instruction rod, a marker, or an eraser (called a "writing tool" hereinafter in this specification), obtaining realtime image information which corresponds to the image formed on the writing surface, and exhibiting a thin structure and light weight.

In accordance with one aspect of the invention, an electronic blackboard apparatus comprises a writing surface, in combination with a tool for modifying an image on the surface, wherein the tool includes a tuned circuit having a predetermined resonant frequency. A sensor for an electric wave having plural frequencies, one of which is the resonant frequency, and an electrical wave detector for an electric wave reflected by the tuned circuit is provided. The sensor includes coordinate detection means responsive to the electric waves reflected from the tool and generated by the generating means for detecting a coordinate corresponding to the position of the tool. Image information processing means processes, on the basis of the thus-detected coordinate, image information corresponding to an image formed by the tool on the surface.

Another aspect of the invention is directed to the combination of a position sensing tablet a two coordinate direction coil arrangement, a two coordinate direction display superposed with the tablet, a marker for the display and an eraser for the display. The marker and eraser each include a tuned circuit respectively having first and second resonant frequencies. AC energy is supplied at the first and second resonant frequencies to the coil arrangement. The tuned circuits on the marker and the eraser, when the marker or eraser is placed in proximity to the tablet and coil arrangement, respectively cause changes in currents flowing in the coil arrangement at the first and second frequencies. The changes in the current flowing in the coil arrangement at the first and second frequencies are sensed. In response to the current changes at the first and second frequencies there is derived a signal indicative of the position of markings by the marker on the display as modified by the eraser.

In accordance with still a further aspect, the invention is directed to the combination of a position sensing tablet, a two coordinate direction coil arrangement associated with the tablet and multiple implements for movement relative to the table. Each of the implements has a different characteristic associated therewith and includes a tuned circuit having a different resonant frequency. AC energy at the different resonant frequencies is supplied to the coil arrangement. The tuned circuits on the implements, when the implements are placed in proximity to the tablet and coil arrangement, cause changes in the currents flowing in the coil arrangement at the different frequencies. Changes in current flowing in the coil arrangement at the different frequencies are sensed. In response to the current changes at the frequencies there is derived a signal indicative of the position and characteristics of the implements on the tablet.

A further aspect of the invention is directed to a method of identifying a characteristic and position of an implement on a position sensing tablet having a two coordinate direction coil arrangement associated therewith, wherein the implement has one of plural characteristics and includes a tuned circuit having one of plural different resonant frequencies. The method comprises supplying AC energy at the plural different resonant frequencies to the coil arrangement. The tuned circuit on the implement, when placed in proximity to the tablet and coil arrangement, causes changes in current flowing in the coil arrangement at the one frequency. Changes in the current flowing in the coil arrangement at the different frequencies are sensed. In response to current changes at the frequencies there is derived a signal indicative of the position and characteristic of the implement on the tablet.

Still another aspect of the invention is directed to an eraser for supplying a signal to an electronic display and for removing a marking from a surface of a visual display. The eraser comprises a housing including: a surface for erasing the marking, first and second tuned circuits each having a reactance positioned in proximity to first and second opposite edges of the erasing surface, as well as first and second switches which when activated respectively cause the first and second tuned circuits to have different first and second resonant frequencies. The first and second switches are positioned and arranged so that the first and second switches are respectively activated in response to the first and second edges of the eraser being pushed against the display surface.

Still a further aspect of the invention is directed to the combination of a position sensing tablet, a two-coordinate direction coil, a two-coordinate direction display superposed with the tablet, and multiple implements for modifying markings of the display. Each implement has a different characteristic associated therewith and includes a tuned circuit having a different resonant frequency for each characteristic. AC energy at the different resonant frequencies is supplied to the coil arrangements. The tuned circuits on the implements, when the implements are placed in proximity to the tablet and coil arrangement, respectively cause changes in the currents flowing in the coil arrangement at the different frequencies. Changes in the current flowing in the coil arrangement at the different frequencies are sensed. In response to current changes at the frequencies there is derived a signal indicative of the position and characteristics of markings by the implements on the display.

Still a further aspect of the invention is directed to the combination of a position sensing tablet, a two-coordinate coil arrangement associated with the tablet, a two-coordinate direction display superposed with the tablet and plural markers for the display. Each of the markers is for a different color on the display. Each of the markers includes a tuned circuit having a different resonant frequency. AC energy at the different resonant frequencies is supplied to the coil arrangement. The tuned circuits on the markers, when the markers are placed in proximity to the tablet and coil arrangement, cause changes in currents flowing in coils of the coil arrangement at the different frequencies. In response to energy coupled between the tablet and markers there is derived a signal indicative of the position of the colors of markings by the markers on the display by sensing changes in current flowing in the coil arrangement at the different frequencies.

Yet an additional aspect of the invention is directed to a method of displaying a polychromatic image by marking a first two-coordinate direction display with plural markers each having a different color and a tuned circuit with a different resonant frequency thereon. Plural frequencies are supplied to a two-coordinate direction coil arrangement. The coil arrangement couples the plural frequencies to each marker as it is marking the first display. The coil arrangement is activated so it is responsive to an interaction of each applied frequency and each tuned circuit to provide an indication of the color and position of the mark being made by each marker on the first display. By responding to the indication there is displayed on a second two-coordinate direction display the position and color of the mark made by each marker on the first display.

Another aspect of the invention concerns a method of indicating the position of an image on a two-coordinate direction display by marking the display with a marker and erasing from the display at least a portion of marks made by the marker. The marker and eraser respectively have tuned circuits with first and second resonant frequencies. A two-coordinate direction coil arrangement is activated so it applies the first and second resonant frequencies to the marker and the eraser as they respectively mark and erase the display. The coil arrangement is activated to be responsive to an interaction of the applied first and second frequencies with the tuned circuits to derive an indication of the position of the marking on the display as modified by the eraser.

Still an additional aspect of the invention is directed to an eraser for supplying a signal to an electronic display and for removing a marking from a surface of a visual display. The eraser has a housing including: a surface for erasing the marking, a tuned circuit having a reactance positioned immediately behind the eraser surface, and switch means activated in response to the erasing surface being pressed against the display surface for connecting elements including the reactance of the tuned circuit together so they have a predetermined resonant frequency while the erasing surface is pressed against the display surface.

A second object of the present invention is to provide an electronic blackboard apparatus capable of identifying the type and the state of the writing tool which is being used and to thereby obtain image information which corresponds to the thus-identified type or state of the writing tool.

A third object of the present invention is to provide an electronic blackboard apparatus including two writing surfaces.

A fourth object of the present invention is to provide a writing tool such exhibiting a simple structure, light weight, and easy handling capability, that is, an instruction rod, a marker, and an eraser.

Other objects and features of the present invention will become more apparent in the description which follows.

DETAILED DESCRIPTION OF THE PREFERRED EMBODIMENT

Figure 1:
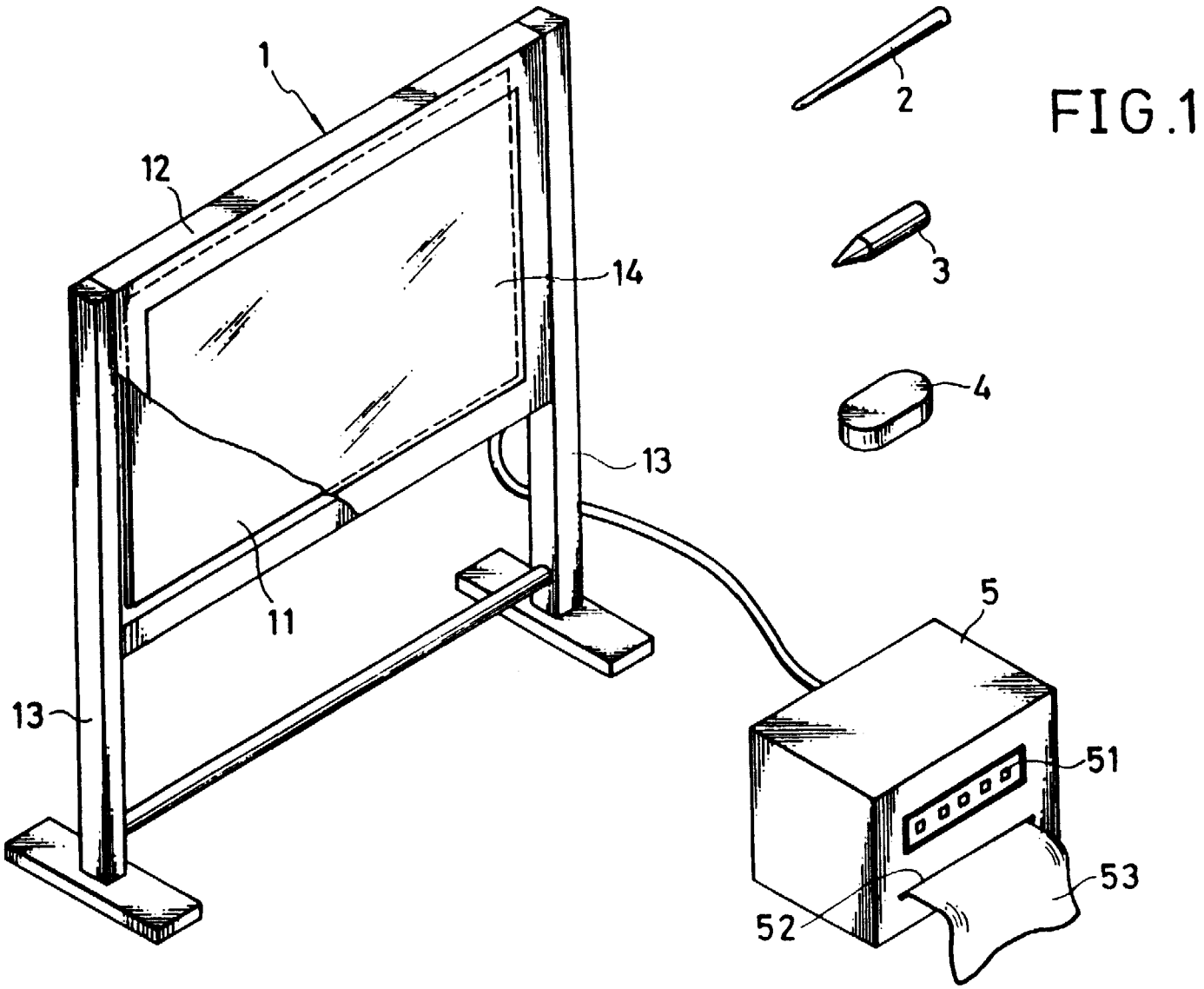
FIG. 1 is a view of a first embodiment of an electronic blackboard apparatus according to the present invention.

FIG. 1 is a view of a first embodiment of an electronic blackboard apparatus according to the present invention, wherein reference numeral 1 represents a main blackboard body, 2 represents an instruction rod, 3 represents a marker, 4 represents an eraser, and 5 represents a control box.

The main blackboard body 1 is formed such that legs 13 are fastened to a frame 12 a portion of which corresponds to the front surface of a sensing portion 11 is made of a non-metallic material having a flat surface so as to form a writing surface 14 which can be repeatedly used with the marker 3 and the eraser 4. Alternatively, the portion of the frame 12 which corresponds to the front surface of the sensing portion 11 may be formed by applying paint to which magnetic dust is mixed to the plate made of the non-metallic material or by laminating a film sheet such as a magnet sheet and a plastic sheet on the same plate for the purpose of realizing a writing surface to which sheet in which intended frames or figures are written can be temporally fastened by metal pieces or magnets.

Figure 2:
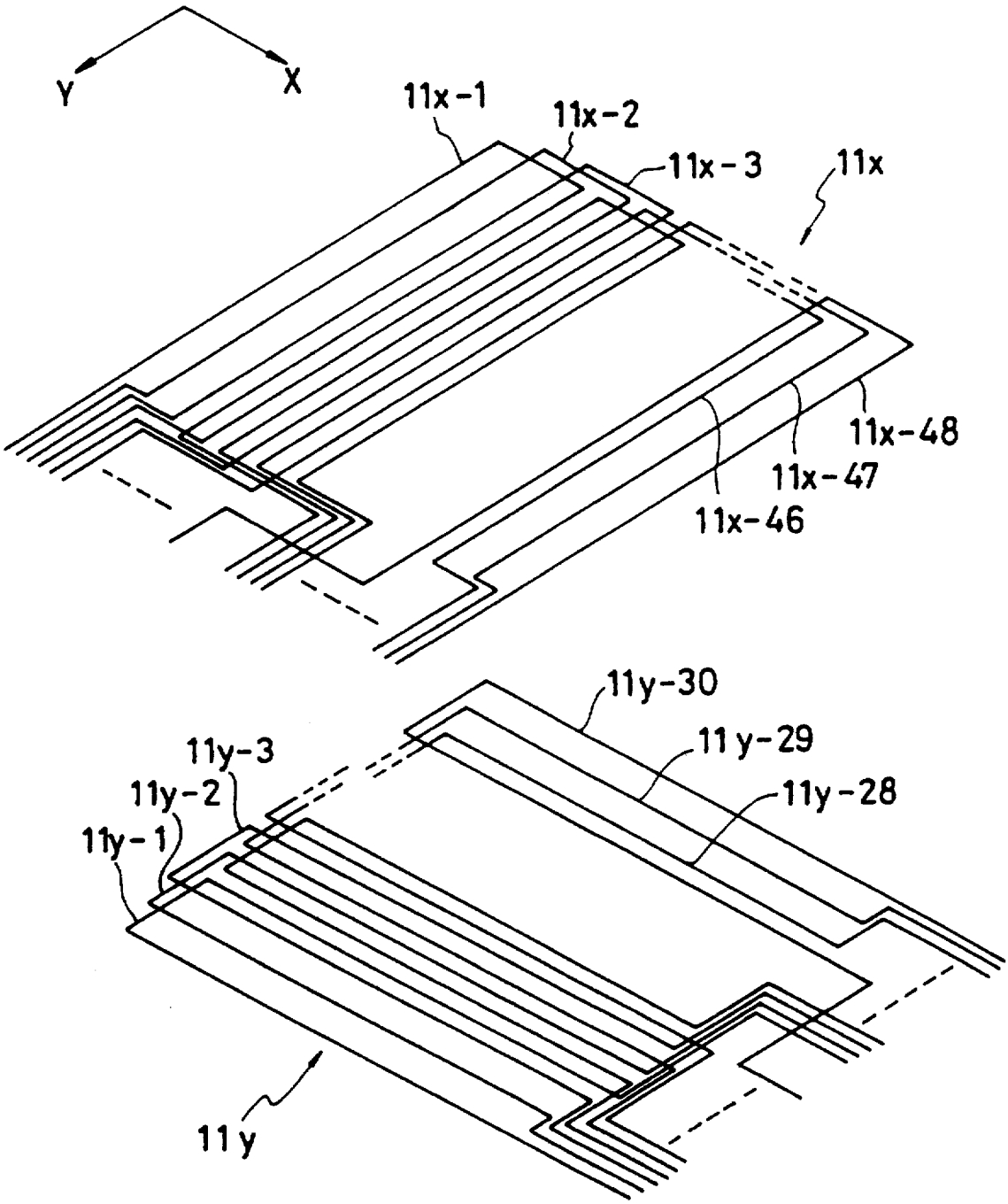
FIG. 2 is a structural view of loop coil groups in X and Y directions of a sensing portion.

In FIG. 2 are illustrated a loop coil group 11x in x-direction and a loop coil group 11y in y-direction which form the sensing portion 11. The loop coil group 11x in x-direction comprises a multiplicity of, for example, 48 loop coils 11x-1, 11x-2, . . . , 11x-48 so as to be arranged in parallel to each other and to overlap each other. The loop coil group 11y in y-direction comprises a multiplicity of, for example, 30 loop coils 11y-1, 11y-2, . . . , 11y-30 so as to be arranged in parallel to each other and to overlap each other. The loop coil group 11x in x-direction and the loop coil group 11y in y-direction overlap each other with positioned closely contact with each other (in order to readily understand the structure, they are drawn in a separated manner). Alternative to the structure employed here in which each of the loop coils is formed by one turn, the loop coils may be formed by a plurality of turns if necessary.

Figure 3:
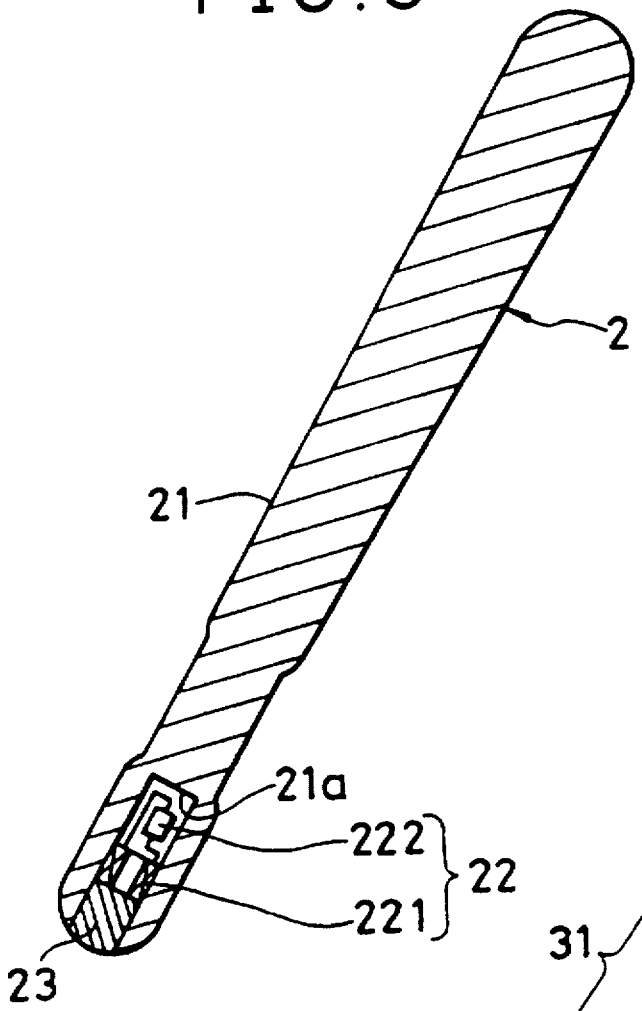
FIG. 3 is a cross-sectional view of an instruction rod.

In FIG. 3 is illustrated a first embodiment of the writing tool and so on according to the present invention, in which the structure of the instruction rod 2 is illustrated. This instruction rod 2 is made of a synthetic resin, wood or the like and is formed in such a manner that a tuning circuit 22 comprising a coil 221 which includes a core and a capacitor 222 is accommodated in a recessed portion 21a formed at the front end portion of a column-like main body 21 made of a synthetic resin or wood in such a manner that the axis of this coil 221 substantially meets the longitudinal direction of the main body 21 (frame), and this recessed portion 21a is covered with a cap 23 made of the similar material to that for the main body 21. The main body 21 may comprise a telescopic rod.

Figure 7:
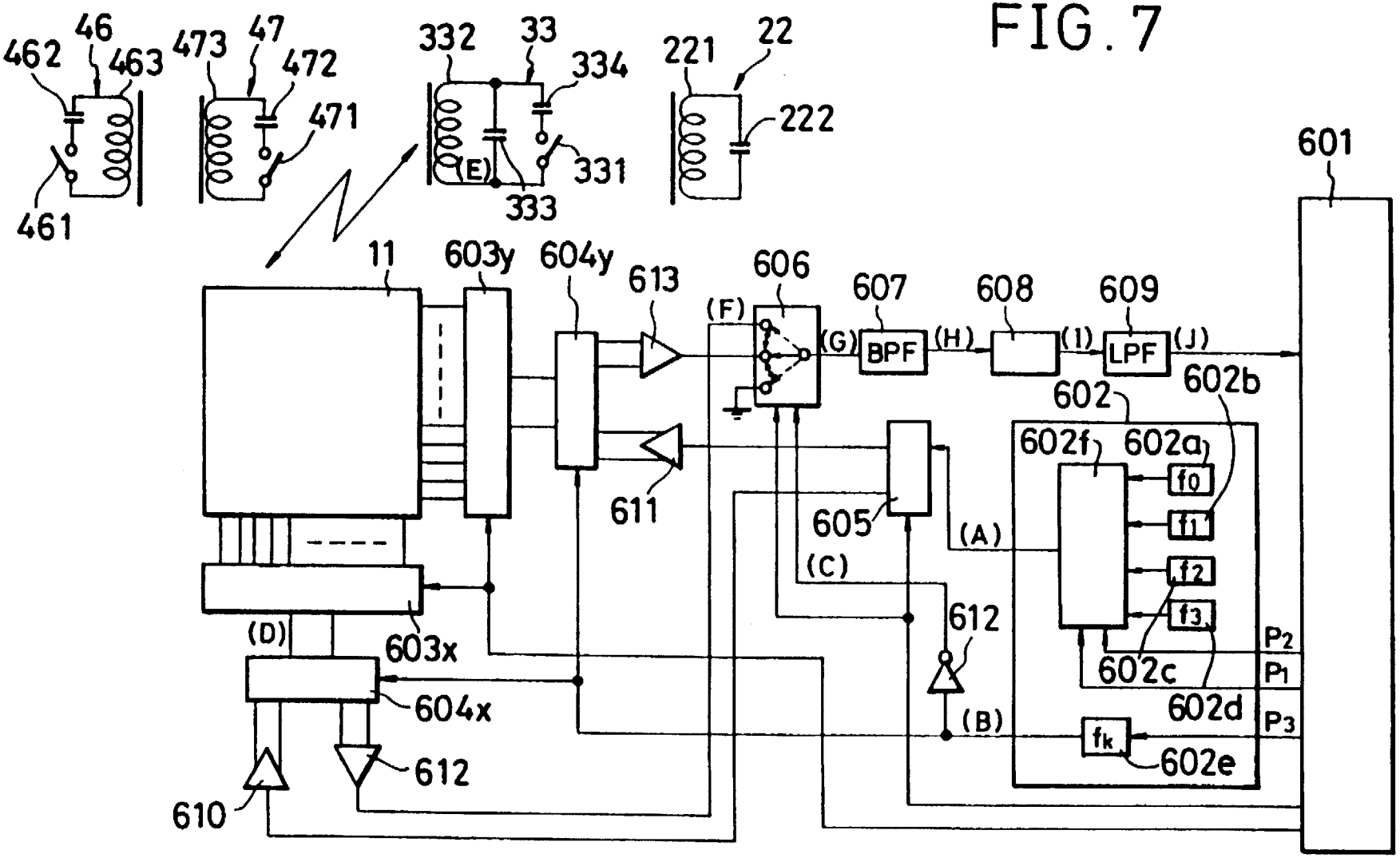
FIG. 7 is a schematic block diagram of tuning circuits for a writing tool and details of a control unit for a sensing portion.

The coil 221 and the capacitor 222 are, as shown in FIG. 7, connected to each other in series so as to form a known resonant circuit. The inductance of this coil 221 and the capacity of the capacitor 222 are determined as to make the resonant (tuned) frequency thereof substantially a predetermined frequency f0, for example, 600 kHz.

Figure 4:
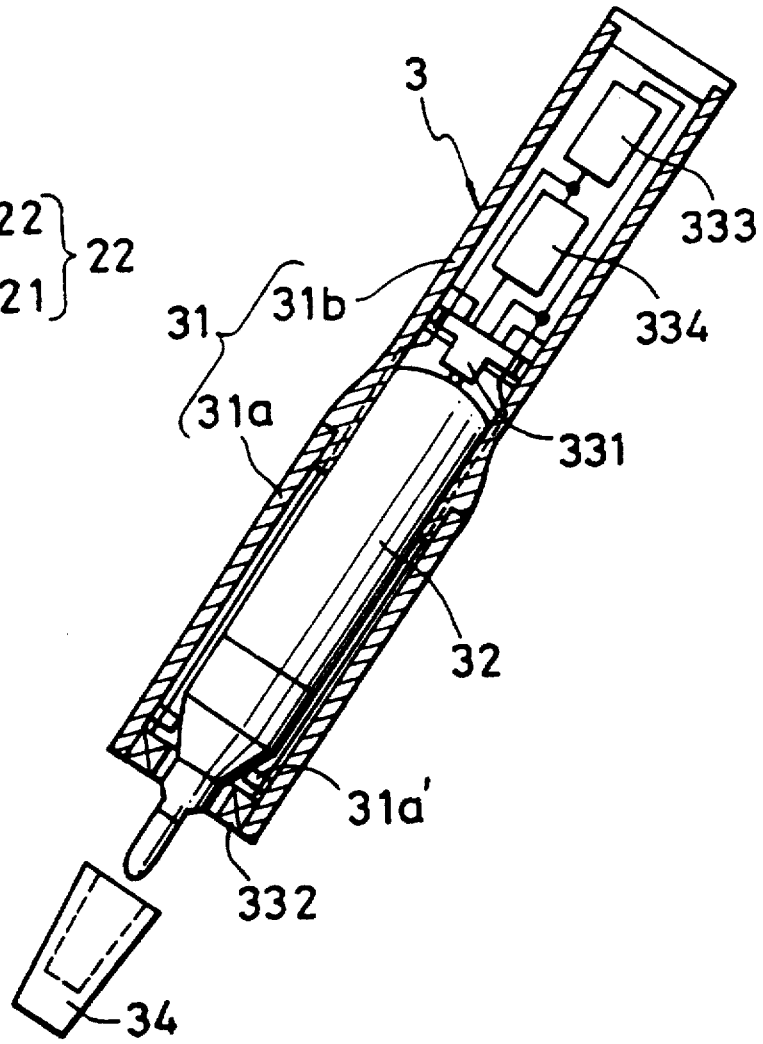
FIG. 4 is a cross-sectional view of a marker.

FIG. 4 is a view of a second embodiment of the writing tool according to the present invention, in which the structure of a marker 3 is in detail illustrated. This marker 3 comprises: a pen shaft 31 formed by two portions 31a and 31b made of a non-metallic material such as a synthetic resin and to be screw-coupled with each other; a pen body 32 such as a black felt pen on the market or the like; a push switch 331; a coil 332 including a core; a tuning circuit 33 comprising capacitors 333 and 334; and a cap 34 for the pen body 32.

The pen body 32 is accommodated in a space formed by a stopper 31a' formed in the portion 31a of the pen shaft 31 and the switch 331 accommodated in the portion 31b such that the same can be slightly moved therein. The coil 332 is accommodated in the portion at the front end of the portion 31a of the pen shaft 31 such that the axial direction thereof is substantially coincident with the longitudinal direction of the pen shaft 31 (frame).

As shown in FIG. 7, the coil 332 and the capacitor 333 are connected to each other in series so as to form a known resonant circuit. The inductance of this coil 332 and the capacity of the capacitor 333 are so determined as to make the resonant (tuned) frequency thereof substantially a predetermined frequency f0, for example, 600 kHz. The capacitor 334 is in parallel connected to the two ends of the capacitor 333 via the switch 331 so that the same acts to change the tuned frequency in the resonant circuit from the predetermined frequency f0 to another frequency f1, for example, 550 kHz when the above-described switch 331 is switched on.

This switch 331 is arranged to be switched on when it is abutted by the rear end of the pen body 32 which has been pushed into the pen shaft 31 as a result of abutting the front end of the pen body 32 against the writing surface 14 or the like with the pen shaft 31 held by the hand or the like.

Although the front end of the pen body is made project over the writing surface as to enable the writing according to this embodiment, it may be arranged to be capable of projecting only when used. The marker is so designed that the pen body 32 included therein can be replaced by so arranging the pen shaft 31 that it can be divided and coupled to each other.

Figure 5:
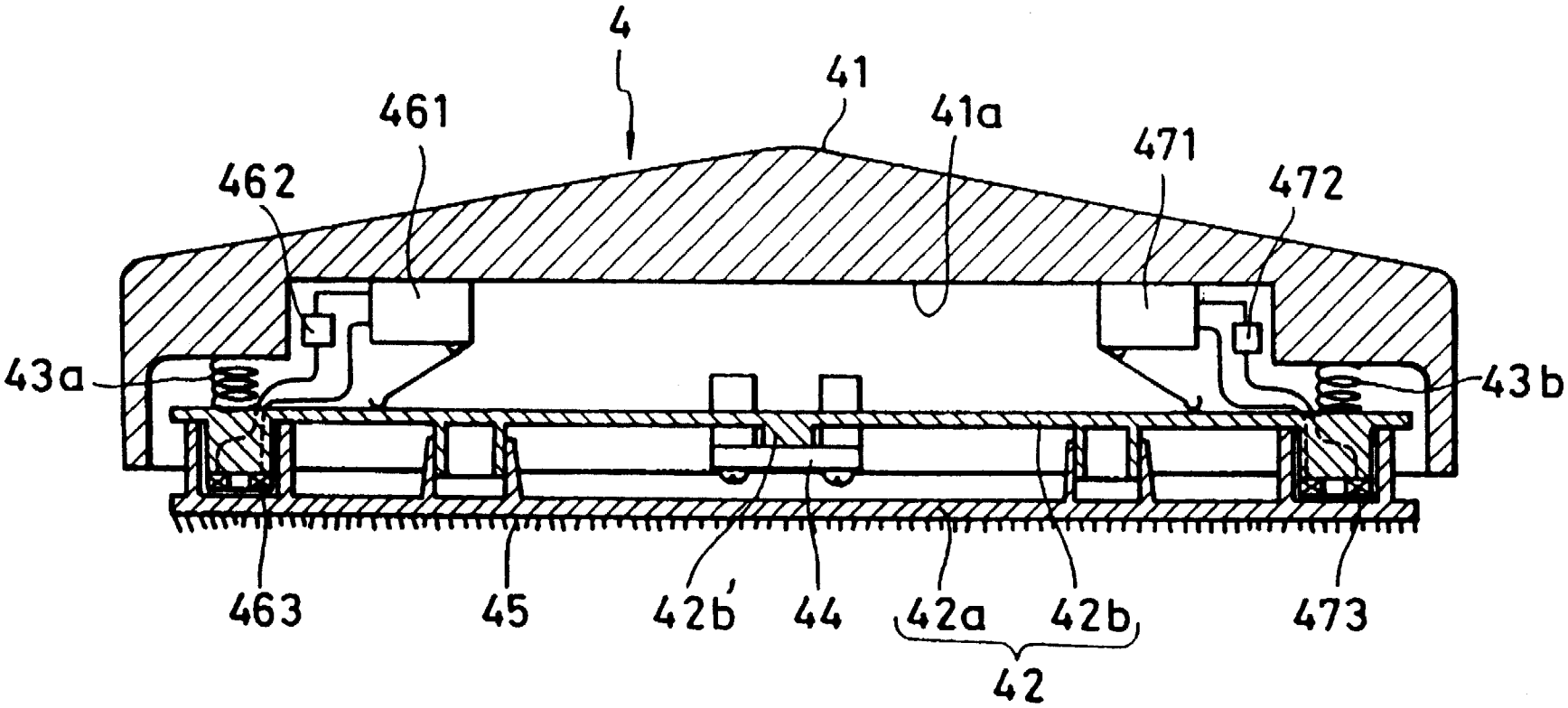
FIG. 5 is a cross-sectional view of an eraser.

In FIG. 5 is illustrated a third embodiment of the writing tool or the like according to the present invention, in which the structure of the eraser 4 is illustrated in detail. This eraser 4 comprises: a case 41 made of a non-metallic material such as a synthetic resin or the like; a movable plate 42 comprising a pair of members 42a and 42b each of which has a shape corresponding to the bottom surface of the case 41 and which are arranged to be detachable to each other; a pair of springs 43a and 43b inserted between the movable plate 42 and the case 41; a stopper 44 disposed in an inner portion 41a of the case 41 and capable of supporting a securing portion 42b' which projects in the direction of the member 42b perpendicular to the drawing sheet for the purpose of restricting the position of the movable plate 42 with respect to the case 41; an erasing member 45 made of felt or the like and fastened to the outer surface of the member 42a of the movable plate 42; a first tuning circuit 46 comprising a switch 461 accommodated in the inner portion 41a of the case 41, a capacitor 462 and a capacitor 463 which includes a core and is held between the members 42a and 42b at the position corresponding to the spring 43a of the movable plate 42 such that the axial direction thereof and the erasing surface formed by the erasing member 45 are substantially perpendicular to each other; and a second tuning circuit 47 comprising a switch 471, a capacitor 472, and a coil 473 which includes a core and is held between the members 42a and 42b at the position corresponding to the spring 43b such that the axial direction thereof and the erasing surface formed by the erasing member 45 are substantially perpendicular to each other. This movable plate 42 is held such that the same can move slightly with respect to the case 41 so that the switch 463 and/or 473 can be operated.

The coil 463 and the capacitor 462 are connected to each other in series via the switch 461 as shown in FIG. 7 so that a known resonant circuit is actuated when this switch 461 is switched on. The inductance of this coil 463 and the capacity of the capacitor 462 are determined as to make the resonant (tuned) frequency thereof substantially another frequency f2, for example, 500 kHz.

The coil 473 and the capacitor 472 are connected to each other in series via the switch 471 as shown in FIG. 7 so that a known resonant circuit is actuated when this switch 471 is switched on. The inductance of this coil 473 and the capacity of the capacitor 472 are determined as to make the resonant (tuned) frequency thereof substantially other frequency f3, for example, 450 kHz.

These switches 461 and 471 are switched off when the eraser 4 is not operated, while either or both of the switches 461 and 471 are switched on by being pressed by the member 42b of the movable plate 42 when the erasing member 45 of the movable plate 42 is pushed into the case 41 by abutting this erasing member 45 against the writing surface 14 or the like with the case 41 held by the hand or the like.

The tuning circuit for the writing tool or the like of the type described above is so arranged that it can be synchronized with the energy of the electric wave discharged from the electric wave generating means in the sensing portion and discharge this energy to the electric wave detection means in the sensing portion for the purpose of meeting the conditions required to perform indication of the position to be measured to the sensing portion.

Figure 6:
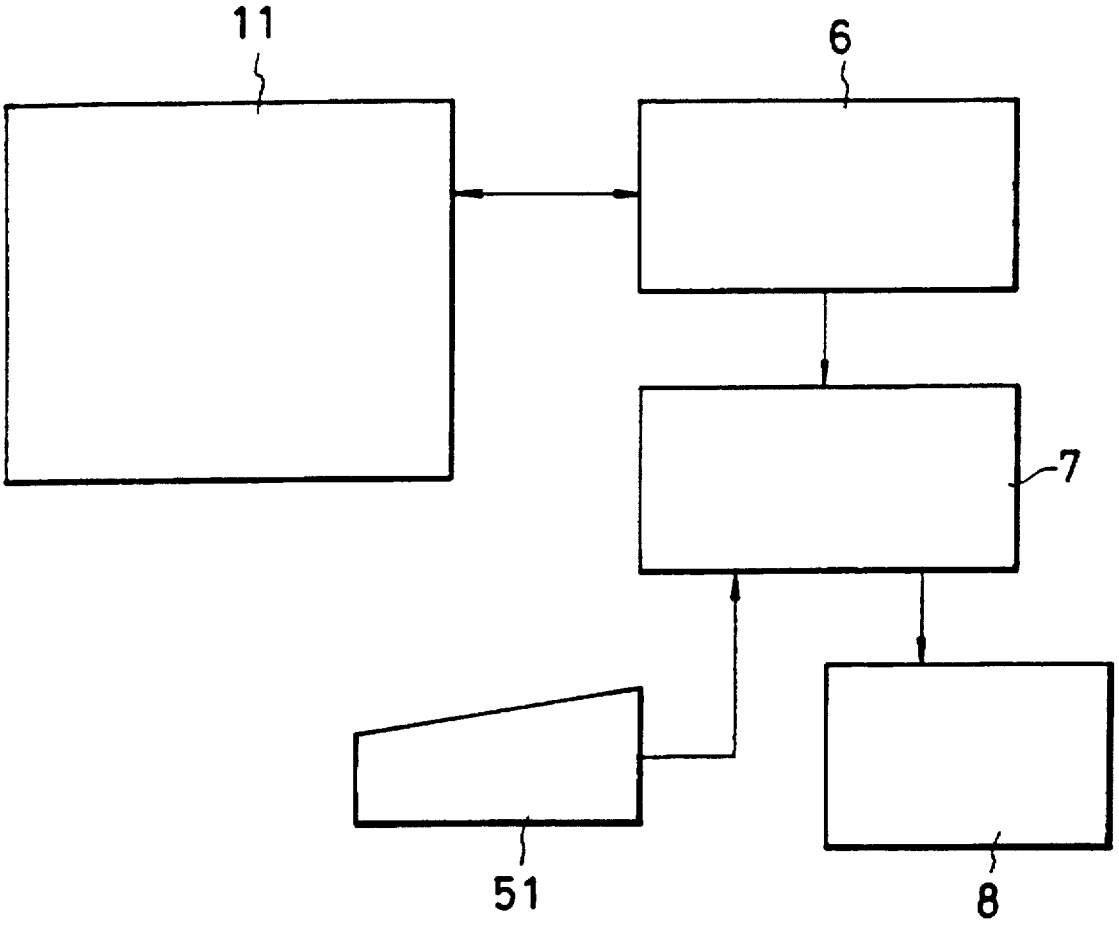
FIG. 6 is a block diagram of the electronic blackboard apparatus according to the present invention.

The control box 5 is provided with, on the front surface thereof, various control switches 51 and an outlet 52 through which printed sheets are discharged, this control box 5 including, as shown in FIG. 6, the sensing portions control unit 6, the data processing unit 7, and a printer 8.

In FIG. 7 is illustrated the sensing portion control unit 6 together with the instruction rod 2, the marker 3, the tuning circuits 22, 33, 46, and 47 for the eraser 4. Referring to this drawing, reference numeral 601 represents a control circuit, 602 represents a signal generating means (circuit), 603x and 603y respectively represent selection means (circuit) in x-direction and y-direction, 604x an 604y represent transmission and reception switch circuits, 605 represents a XY switch circuit, and 606 represents a reception timing switch circuit, whereby connection switch means is formed. Reference numeral 607 represents a BPF (Band-Pass Filter) which forms a signal detection means. Reference numeral 608 represents a detector and 609 represents an LPF (Low-Pass Filter) which form coordinate detection means and writing tool or the like identification means in which a process performed by the control circuit 601 to be described later is included. Reference numerals 610 an 611 represent drive circuits, 612 and 613 represent amplifiers, and 614 represents an inverter.

Figure 8:
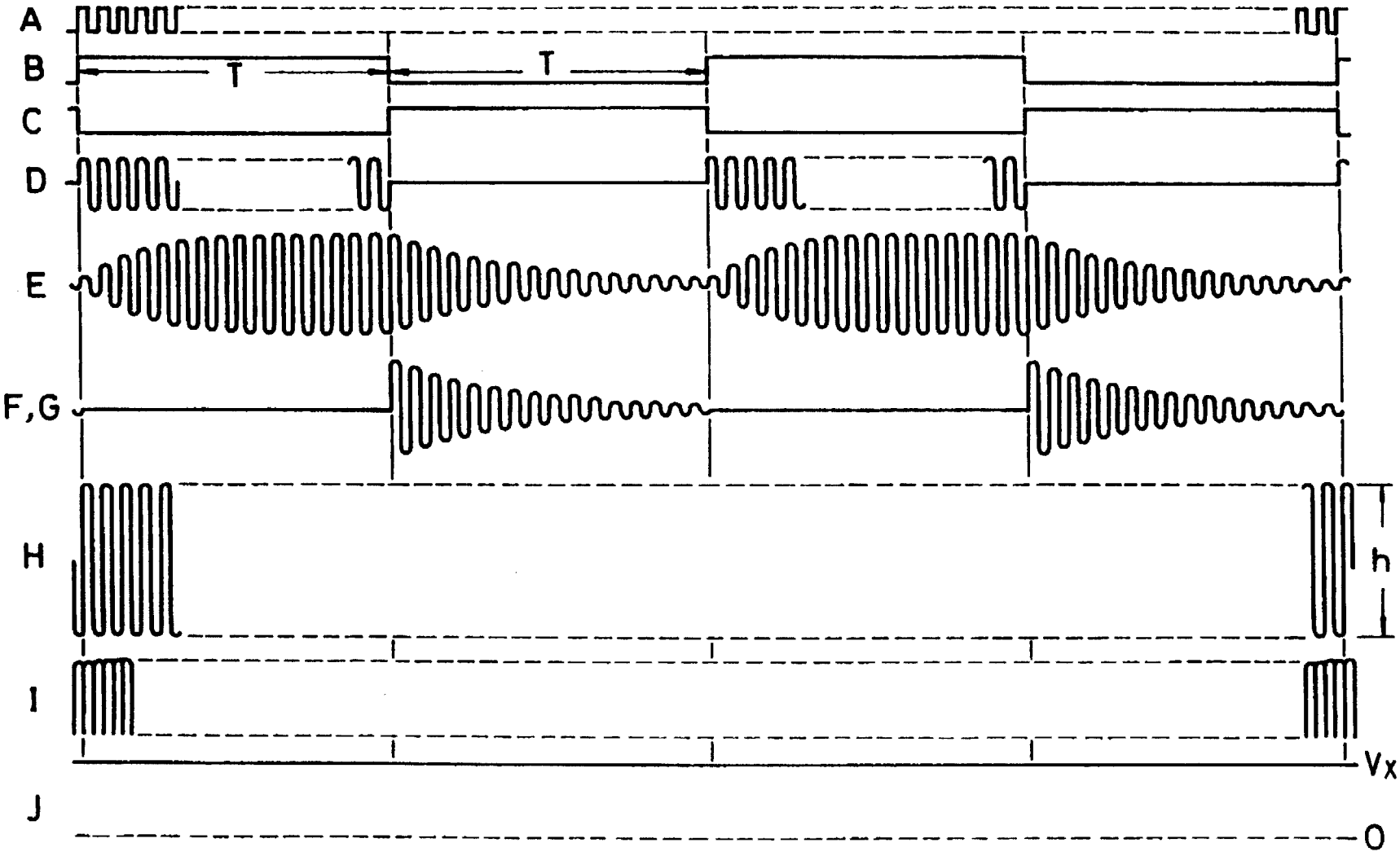
FIG. 8 is a series of waveforms used for describing the circuit of FIG. 7.

The operation of the sensing portion control unit 6 with the structure thereof will be described. First, the signal transmission and receipt between the sensing portion 11 and the writing tool or the like and the thus-obtained signals will be described with reference to FIG. 8.

The control circuit 601 comprises a known type of a microprocessor or the like. It acts to: supply a frequency switch signals p1 and P2 (quadrual counter data) and a timing signal (start pulse) p3 to the signal generating circuit 602 in accordance with a flow chart to be described later: control the switching of the loop coils in the sensing portion 11 via the selection circuits 603x and 603y; control the switching of the coordinate detection direction performed by the XY switch circuit 605 and the reception timing switch circuit 606; analog-digital (A/D) convert the output data from the low pass filter 609 for the purpose of obtaining the coordinate of the writing tool or the like by performing calculations to be described later; and supply the frequency switch signals p1 and p2 when the above-described coordinate is obtained to the data processing unit 7, these frequency switch signals p1 and p2 serving information representing the type or the state (a state of the switch for the marker 3) of the writing tool or the like.

The signal generating circuit 602 comprises a rectangular signal generators 602a, 602b, 602c, 602d, and 602e, and a multiplexer 602f for respectively generating predetermined frequencies f0, f1, f2, f3, and fk.

The rectangular signals having frequencies from f0 to f3 are arranged to be input to the multiplexer 602f whose switching is controlled in response to the switch signals p1 and p2. When the switching signals p1 and P2 are "00", the signal having the frequency f0 is output, when the same are "01", the signal having the frequency fl is output, when the same are "10", the signal having the frequency f2 is output, and when the same are "11", the signal having the frequency f3 is output, the thus-generated signal being output in the form of a rectangular signal A. The thus-output rectangular signal A is converted to a sine-wave signal by a low-pass filter (omitted from illustration), and is then supplied to either the drive circuit 610 or 611 via the XY switch circuit 605.

A rectangular signal having the frequency fk, for example, 18.75 kHz, is transmitted to the transmission and reception switch circuits 604x and 604y in the form of a transmission and reception switch signal B, and is simultaneously inverted via the inverter 614 as to be transmitted to the reception timing switch circuit 606 in the form of a reception timing signal C. The rectangular signal generator 602e is reset by the start pulse p3.

The selection circuit 603x successively selects a loop coil from the x-direction loop coil group 11x, while the selection circuit 603y successively selects a loop coil from the y-direction loop coil group 11y, each of these selection circuits 603x and 603y acting in response to information supplied from the control circuit 601.

The transmission and reception switch circuit 604x alternately connect the thus-selected x-direction loop coil to the drive circuit 610 and the amplifier 612. The transmission and reception switch circuit 604y alternately connect the thus-selected y-direction loop coil to the drive circuit 611 and the amplifier 613. These transmission and reception switch circuits 604x and 604y act in accordance with the transmission and receipt switch signal B.

It is assumed that "00" has been, together with the start pulse p3, supplied from the control circuit 601 to the signal generating circuit 602 in the form of the switch signals p1 and p2 and information to select x-direction has been input to the XY switch circuit 605 and the reception timing switch circuit 606, the sine-wave signal having the frequency f0 is supplied to the drive circuit 610 in which it is converted to an equilibrium signal before being supplied to the transmission and reception switch circuit 604x. Since this transmission and reception switch circuit 604x switches and connects either of the drive circuit 610 or the amplifier 612 in response to the transmission and reception switch signal B, a signal to be output from the transmission and reception switch circuit 604x to the selection circuit 603x becomes a signal D which intermittently outputs a sine-wave signal 600 kHz every time period T (=½ fk), where it is substantially 27 μsec here.

This signal D is transmitted to the x-direction loop coil 11x-i (i=1, 2, . . . , 48) in the sensing portion 11 via the selection circuit 603x, this loop coil 11x-i generating an electric wave on the basis of the signal D.

In this state, when the writing tool, for example, the marker 3 is held substantially vertically on the writing surface 14 of the main blackboard body 1 with the switch 331 switched off, the above-described electric wave excites the coil 332 of the marker 3 so that an induced voltage E synchronized with the signal D is generated in the tuning circuit 33 of the coil 332.

When the state of the signal D is then brought to a no-signal period, that is, signal reception period and simultaneously the loop coil 11x-i is switched to the amplifier 612, the electric wave from this loop coil 11x-i is immediately eliminated. On the other hand, the above-described induced voltage E is gradually damped in accordance with loss in the tuning circuit 33.

On the other hand, the electric current passing through the tuning circuit 33 in accordance with this induced voltage E causes the coil 332 to transmit an electric wave. Since the thus-transmitted electric wave excites the loop coil 11x-i connected to the amplifier 612 on the contrary, an induced voltage on the basis of the electric wave from the coil 332 is generated. The thus-generated induced voltage is transmitted from the transmission and reception switch circuit 604x to the amplifier 612 during only the signal reception period so that it is amplified to become a reception signal F, and is then transmitted to the reception timing switch circuit 606.

Either of the selection information in x-direction or y-direction, the x-direction selection information and the reception timing signal C in this case, are input to the reception timing switch circuit 606. When this signal C is at the high (H) level, a reception signal F is output, while no signal is output when the same is at the low (L) level. Therefore, a signal G (substantially the same as the reception signal F) is obtained at the output of the reception timing switch circuit 606.

Since this signal F is transmitted to the band-pass filter 607 which is a filter including the frequency f0 to f3 in its band-pass region, a signal H (strictly, in the state in which a plurality of signals G have been input to and converged in the band-pass filter 607) having an amplitude h in accordance with energy of the frequency components from f0 to f3 in the above-described signal G transmitted to the detector 608.

The signal H input to the detector 608 is detected and rectified as to be made a signal I. Then, this signal I is converted into a direct current J having a voltage level corresponding to a half of the above-described amplitude h, for example, Vx by a low-pass filter 609 with a sufficiently low cut-off frequency as to be transmitted to the control circuit 601.

The voltage level Vx of the signal J relates to the distance between the marker 3 and the loop coil 11x-i, where it is a value in inverse proportion to substantially the fourth power of the distance between the marker 3 and the loop coil 11x-i. Therefore, when the loop coil 11x-i is switched, this voltage Vx of the signal J is varied. As a result, the x-coordinate of the marker 3 can be obtained by converting, in the control circuit 601, the voltages Vx obtained for each of the loop coils into digital values and by having the thus-obtained digital values subjected to the arithmetic process to be described later. The y-coordinate of the marker 3 can be obtained similarly.

On the other hand, when the marker 3 and the writing surface 14, that is the sensing portion 11, are disposed away from each other, or when the marker 3 is disposed substantially in parallel to the sensing portion 11, the electric wave transmitted from the loop coil in the sensing portion 11 does not excite the coil 332 of the marker 3. Therefore, no induced voltage E is generated in the turned circuit 33. In this state, since also no electric wave is transmitted from the coil 332 of the tuning circuit 33, no induced voltage F is generated in the loop coil of the sensing portion during signal reception so that the coordinate cannot be detected (practically, a slight level of induced voltage is generated in both the tuned circuit and the loop coil in the sensing portion, their levels are insufficient to perform the coordinate detection). The above-described frequency switch signals p1 and p2 are the values counted by the quadrual ring counter formed by a program or the like in the control circuit 601. This counter is stepped to "1" when no reception signal, that is, no induced voltage is obtained in the control circuit 601 and the detection of the coordinate is thereby impossible to be performed. The value counted at this time is, together with the start pulse p3, arranged to be transmitted in the form of the switch signals p1 and p2 to the signal generating circuit 602. Therefore, during the period in which no reception signal is obtained, the frequency of the AC signal is successively switched from f0 to f3 so that the detection of the coordinate is performed by repeating this switching of the frequency.

If any reception signal is obtained, the x and y-coordinates can be obtained as described above. At this time, if the switch signal p1 and p2 are "00" or "01", that is if the frequency of the AC signal is f0 or f1, the above-described counter is not stepped so that the frequencies of the switch signals p1 and p2, that is the frequency of the AC signal is maintained intact. On the other hand, if the switch signal p1 and p2 are "10" or "11", that is if the frequency of the AC signal is f2 or f3, the above-described counter is stepped by "1" so that the frequencies of the switch signals p1 and p2, that is the frequency of the AC signal is successively switched.

As described above, when the tuning circuit 22 and 20 the switch 331 of the instruction rod 2 are turned off, the tuned frequency of the tuning circuit 33 of the marker 3 is f0, when the switch 331 is switched on, the tuned frequency of the tuning circuit 33 of the marker 3 is f1, when the switch 461 is switched on, the tuned frequency of the tuning circuit 46 of the eraser 4 is f2, and when the switch 471 is switched on, the tuned frequency of the tuning circuit 47 of the eraser 4 is f3. Therefore, if the switch signals p1 and p2 representing the frequency of the AC signal are "00" when the reception signal can be obtained, a fact can be detected that the apparatus is used such that the instruction rod 2 or the pen body 32 of the marker 3 is not positioned in contact with the writing surface 14 and thereby the switch 331 is switched off. If the switch signals p1 and p2 are "01", a fact can be detected that the apparatus is used such that the pen body 32 of the marker 3 is positioned in contact with the writing surface 14 and thereby the switch 331 is switched on, that is, a fact can be detected that image is being written on the writing surface 14. If the switch signals p1 and p2 are "10" or "11", a fact can be detected that the apparatus is used such that the erasing member 45 of the eraser 4 is positioned in contact with the writing surface 14 and thereby the switch 416 or 471 is switched on, that is, a fact can be detected that the image on the writing surface is being erased.

Therefore, the switch signals p1 and p2 representing the frequencies of the AC signal when the above-described reception signal is obtained serve identification information representing the type or the state of use of the writing tool which is being used on the writing surface 14.

Figure 9:
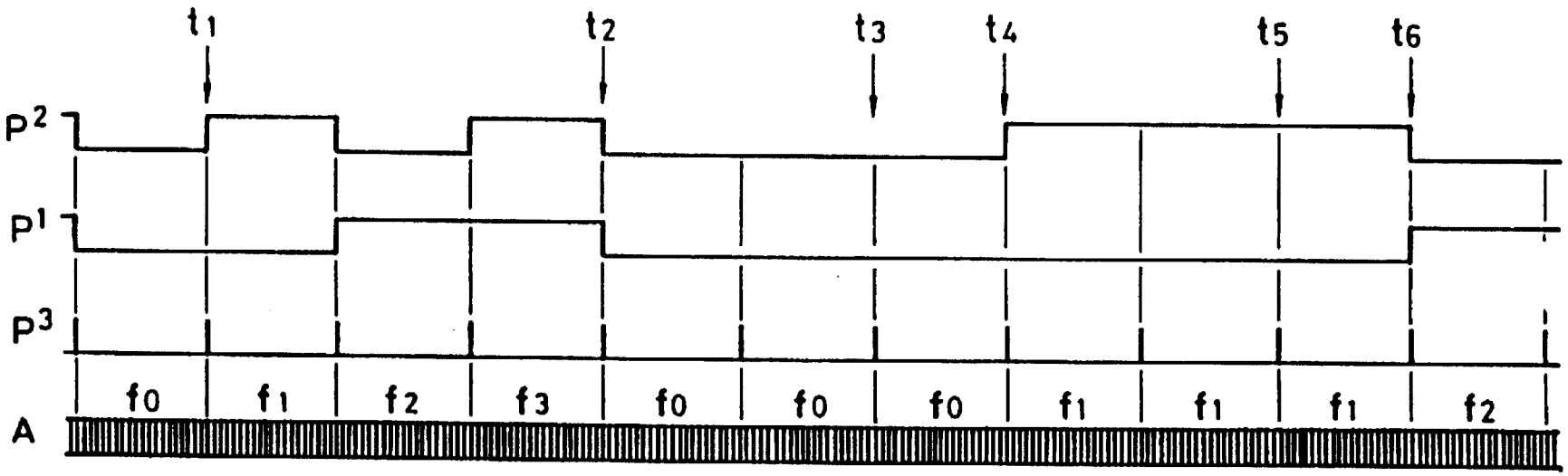
FIG. 9 is a timing diagram used to describe the circuit of FIG. 7.

FIG. 9 is a timing diagram of an example of transition of the switch signals p1 and p2. First, when the writing tool or the like is positioned away from the writing surface 14, the switch signals p1 and p2 are successively switched as "00", "01", "10", and "11". When the writing tool or the like, for example, the marker 3 is allowed to come closer to the writing surface 14 with substantially erected, the coordinate is detected by the AC signal having the frequency f0, causing the AC signal having the frequency f0 to be generated repeatedly. Then, when the pen body 32 is brought into contact with the writing surface 14 (brought to a pen down state) between the time point t3 and t4, that is, when the switch 331 is switched on, the coordinate detection by means of the AC signal having the frequency f1 is repeatedly performed. Furthermore, when the pen body 32 of the marker 3 is moved away from the writing surface 14 (brought to a pen up state), that is, when the switch 331 is switched off, the coordinate detection by means of the AC signal having the frequency f1 is stopped. Then, a transition to frequency f2 and f3 is, similarly to the above-description, realized.

The data of the switch signals p1 and p2 are, together with the obtained x and y-coordinate data, supplied to the data processing unit 7.

As described above, when the switch signals p1 and p2 representing the frequency of the AC signal are "00" or "01" at the time of obtaining the reception signal, the frequency of the switch signal, that is, the frequency of the AC signal is maintained intact. The reason for this lies in that the cycle of detecting the coordinate when the instruction rod 2 or the marker 3 is used is intended to be shortened as possible for the purpose of improving following-up performance. On the other hand, when the switch signals p1 and p2 representing the frequency of the AC signal are "10" or "11" at the time of obtaining the reception signal, the frequency of the switching signal, that is, the frequency of the AC signal is successively switched. The reason for this lies in that two tuning circuits 46 and 47 having individual frequencies are sometimes operated and their coordinates thereby need to be simultaneously detected when the eraser 4 is used. In addition, the significantly excellent following-up capability is not needed with respect to the marker 3 or the like which writes image. The structure may be arranged such that the signals f0 to f3 are always and repeatedly generated regardless of the results of the coordinate detection although the coordinate-detection speed is slightly reduced.

Figure 10:
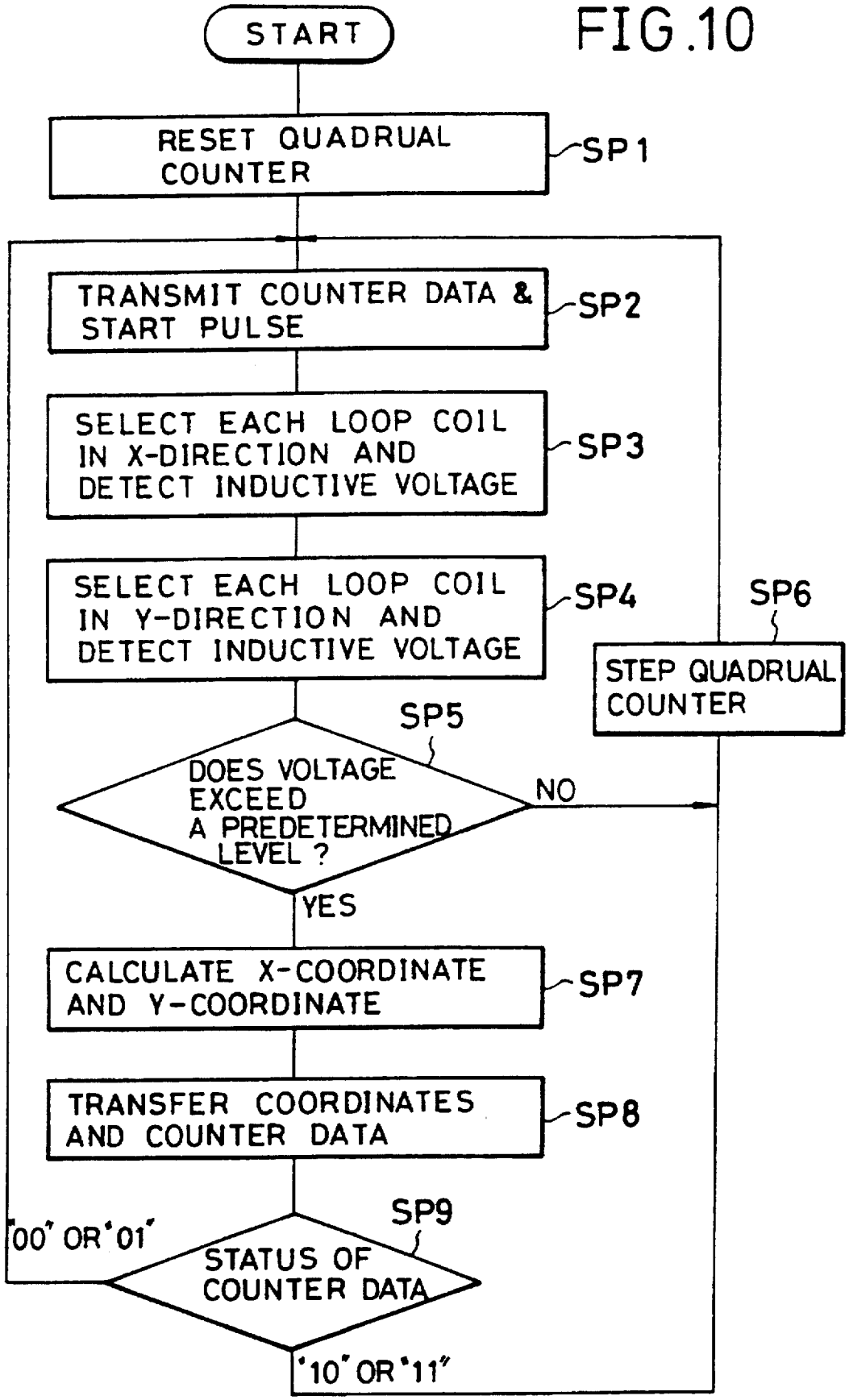
FIG. 10 is a flow chart of the coordinate-detection action performed by a control unit of the sensing portion.
Figure 11:
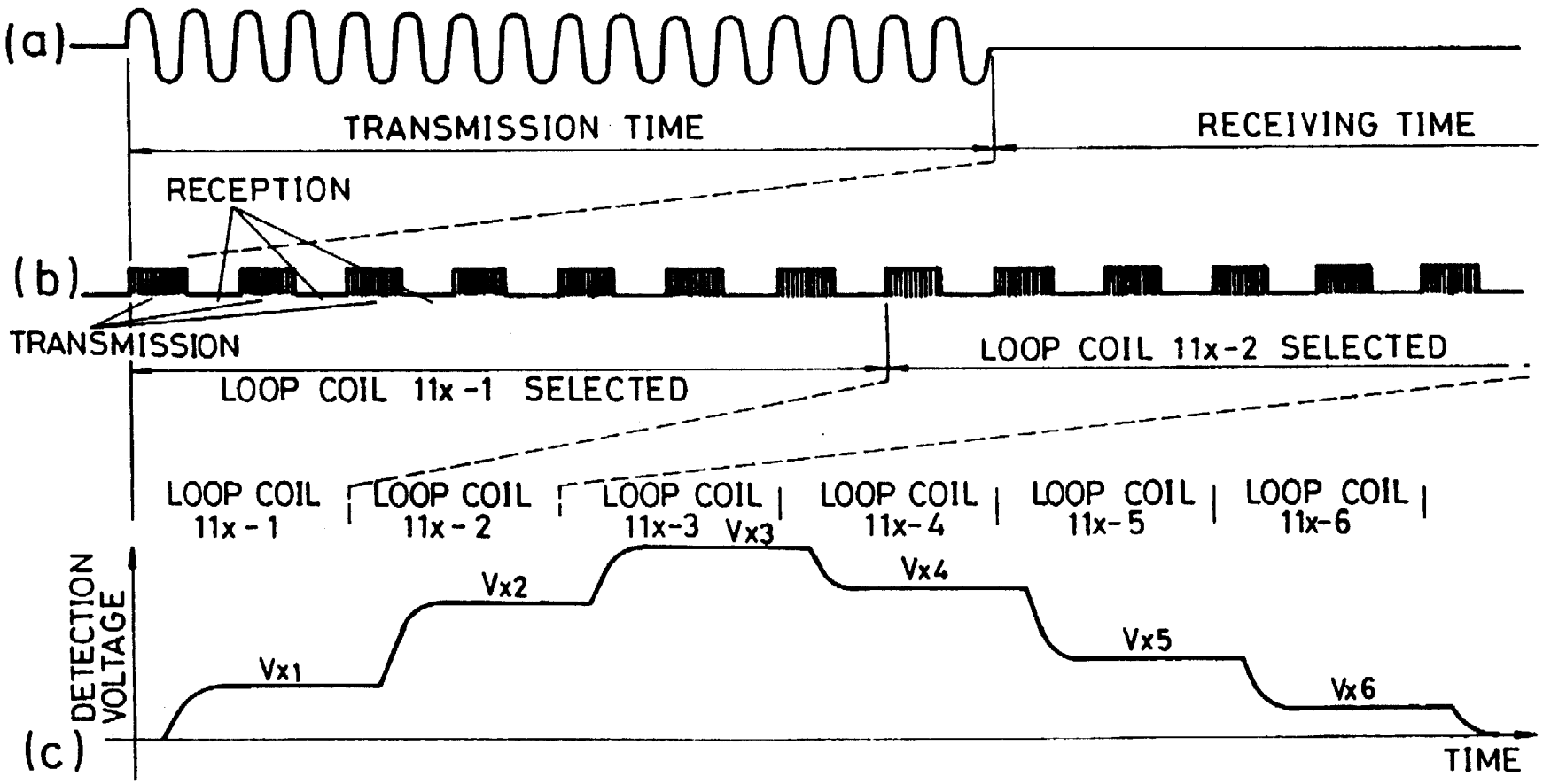
FIGS. 11A, 11B, and 11C are further waveforms used for describing coordinate detection action performed by the control unit of the sensing portion.

Then, the operation of the sensing portion control unit 6 will be in detail described with reference to FIGS. 10 to 12.

The control circuit 601 resets the above-described quadrual counter (step sp1), transmits the thus-obtained counter data, that is, the switch signals p1 and p2 with the start pulse p3 to the signal generating circuit 602 (step sp2). transmits information for selecting x-direction to the XY switch circuit 605 and the transmission and reception switch circuit 606, transmits information for selecting the first loop coil 11x-1 from the x-direction loop coils from 11x-1 to 11x-48 in the sensing portion 11 to the selection circuit 603x, and connects the thus-selected loop coil 11x-1 to the transmission and reception switch circuit 604x.

The transmission and reception switch circuit 604x alternately connects the loop coil 11x-1 to the drive circuit 610 and the amplifier 61 in response to the above-described transmission and reception switch signal B. At this time, the drive circuit 610 transmits 16 sine wave signals of 600 kHz as shown in FIG. 11A to the loop coil 11x-1 during the signal reception time period of substantially 27 μsec.

The above-described switching between signal transmission and signal reception are, as shown in FIG. 11B, repeated 7 times for one loop coil, where it is 11x-1. The time period in which the signal transmission and signal reception are repeated 7 times corresponds to the selection period for one loop coil.

At this time, an induced voltage can be obtained at the output of the amplifier 612 for one loop coil every reception time period of 7 times. The thus-obtained induced voltages are, as described above, transmitted to the band-pass filter 607 via the reception timing switch circuit 606, wherein the same is averaged and then is transmitted to the control circuit 601 via the detector 608 and the low-pass filter 609.

The control circuit 601 inputs the output value from the above-described low-pass filter 609 after A/D converting the same as to store the same as the detected voltage related to the distance between the writing tool or the like and the loop coil 11x-1, for example as Vx1.

Then, the control circuit 601 transmits information for selecting the loop coil 11x-2 to the selection circuit 603x, connects this loop coil 11x2 to the transmission and reception switch circuit 604x, obtains and stores the detection voltage Vx2 relating to the distance between the writing tool or the like and the loop coil 11x-2, successively and similarly connects the loop coils 11x-3 to 11x-48 to the transmission and reception switch circuit 604x, and stores the detection voltages Vx1 to Vx48 (however, FIG. 11C illustrates only a part of the voltages in an analog-like manner) relating to each of the distances between each of the loop coils as shown in FIG. 11C and the writing tool or the like in x-direction (step sp3).

Figure 12:
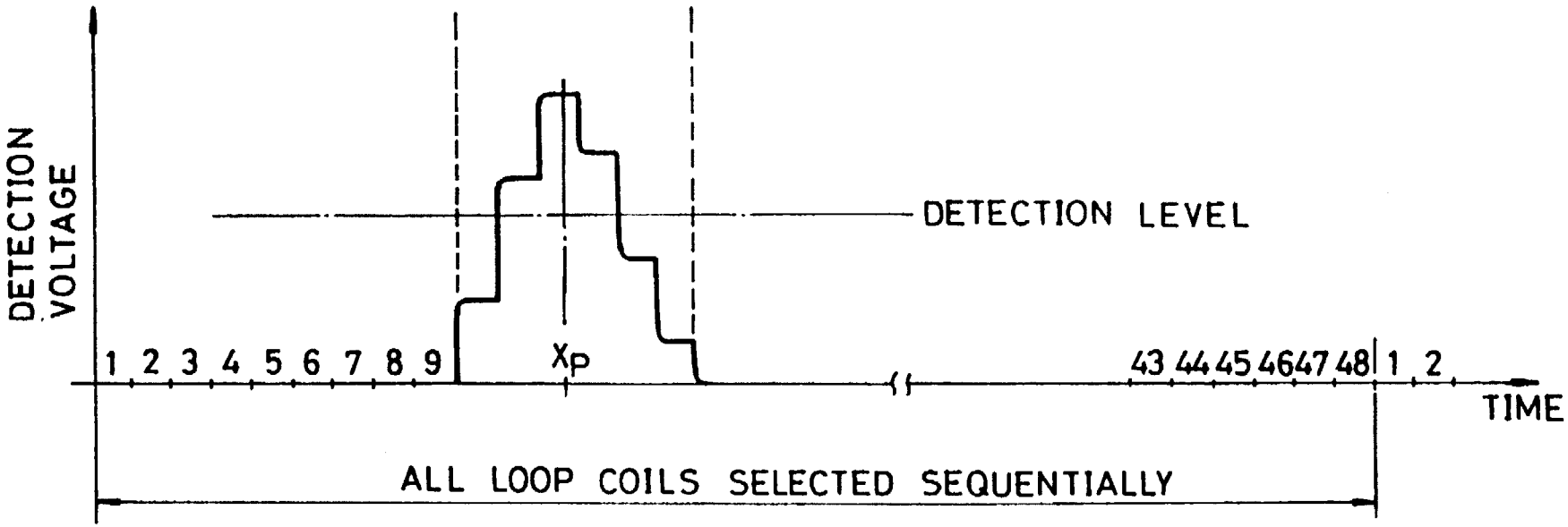
FIG. 12 is a waveform of the levels of the detected voltage obtainable from each of the loop coils when coordinate detection action is performed.

The practical detected voltages are, as shown in FIG. 12, obtained in several loop coils centering the position (xp) of the writing tool.

Then, the control circuit 601 transmits y-direction selection information to the XY switch circuit 605 and the reception timing switch circuit 606, similarly switches the selection circuit 603y and the transmission and reception switch circuit 604y, and temporally stores the detected voltage relating to each of the distances between the writing tool or the like and each of the loop coils 11y-1 to 11y-30 in y-direction and obtained by A/D-converting the output value from the low-pass filter 609 (step sp4).

Then, the control circuit 601 determines whether or not the level of the detected voltage which has been stored exceeds a predetermined level (step sp5). If it is below the predetermined level, the quadrual counter is stepped by "1" (step sp6), and the above-described steps sp2 to sp5 are repeated. If the same exceeds the predetermined level, the x and y-coordinates of the writing tool or the like are calculated from the thus-stored voltage level in a manner to be described later (step sp7), transmits the thus-calculated coordinates with the switch signals p1 and p2 to the data processing unit 7 (step sp8), and determines whether or not the switching signals p1 and p2 is "00" or "01" at this time (step sp9). If the same are "00" or "01", the process according to steps sp2 to sp9 are repeated with the quadrual counter maintained intact. If the same are "10" or "11", the quadrual counter is stepped by "1" (step sp6), and the processes according to steps sp2 to sp9 are repeated.

As a method for calculating the x or y-coordinate, for example, the above-described coordinate xp, there is a method in which the waveforms in the vicinity of the maximal values of the above-described detected voltages Vx1 to Vx48 are approximated by an appropriate function and the coordinates of the maximal value of this function are calculated.

For example, referring to FIG. 11C, when the detected voltage Vx3 of the maximal value and the detected voltages Vx2 and Vx4 disposed on both sides of the former are approximated by a quadratic function, the coordinates can be calculated as follows (where it is provided that the coordinates of the central position of each of the loop coils 11x-1 to 11x-48 are x1 to x48 and the distances between the central positions are Δx): first, from each of the voltages and the coordinates, $$Vx2=a(x2-xp)^2+b \quad (1)$$

$$Vx3=a(x3-xp)^2+b \quad (2)$$

$$Vx4=a(x4-xp)^2+b \quad (3)$$

where a and b represent constants (a>0). Furthermore, the following equations holds:

$$x3-x2=\Delta x \quad (4)$$

$$x4-x2=2\Delta x \quad (5)$$

Substituting Equations (4) and (5) into Equations (2) and (3) before rearrangement, the following equation holds:

$$xp=x2+Dx/2\ \{3Vx2-4Vx3+Vx4)/(Vx2-2Vx3+Vx4)\} \quad (6)$$

Therefore, the coordinate xp of the writing tool or the like can be calculated by performing the calculation expressed in Equation (6) by using the detected voltage of the maximal value and the detected voltages in the vicinity of this maximal value which have been obtained at the above-described level check extracted from the detected voltages Vx1 to Vx48 and the coordinates (known) of the loop coil which is disposed forward by one from the loop coil at which the detected voltage of the above-described maximal value has been obtained.

Figure 13:
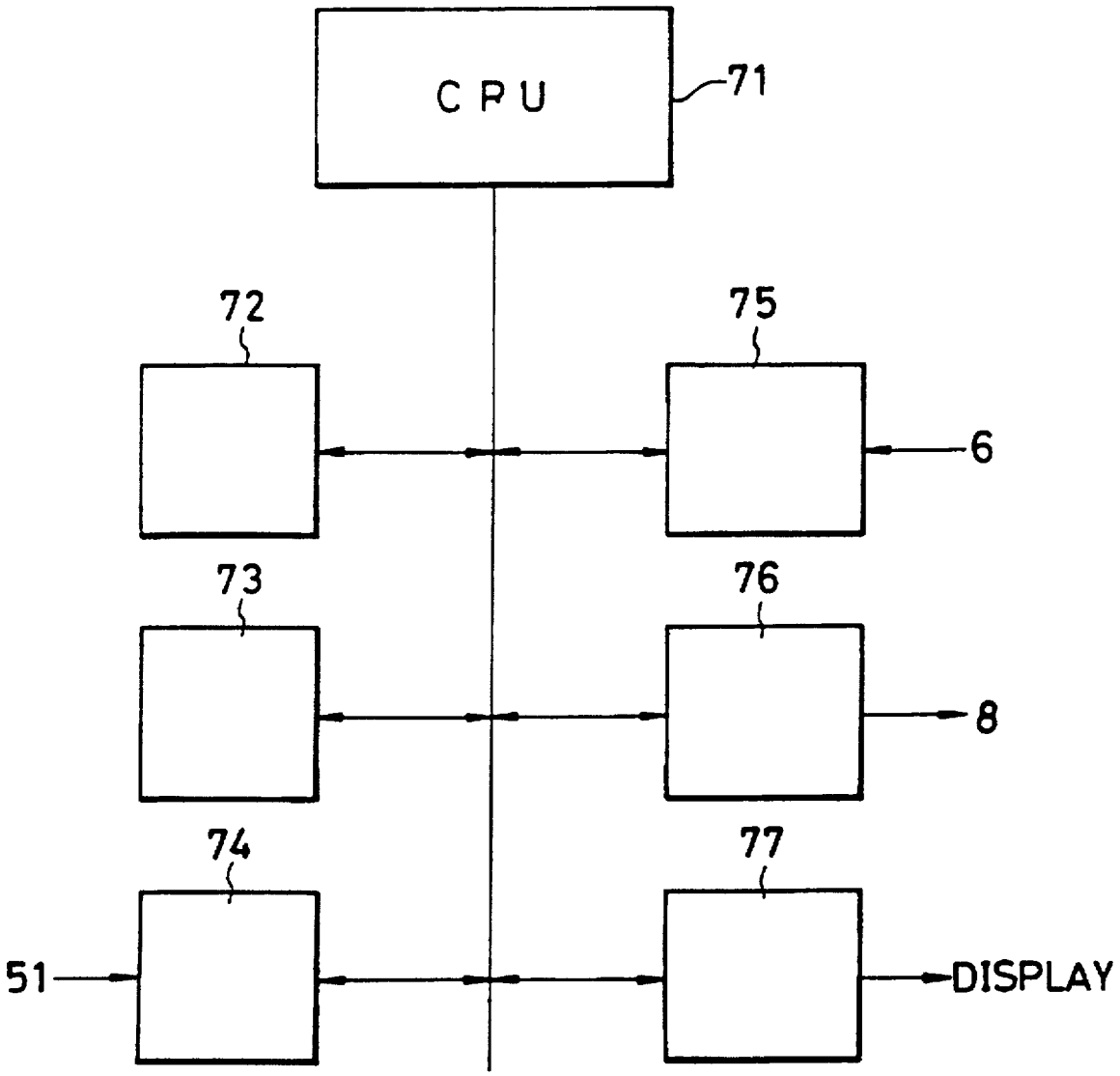
FIG. 13 is a block diagram of a data processing unit used with the present invention.

FIG. 13 is a block diagram of the data processing unit 7, wherein reference numeral 71 represents a microprocessor (CPU), 72 represents a frame memory, 73 represents a overlay memory, 74, 75, 76, and 77 represent interface circuits which respectively corresponds to the operation switch 51, sensing portion control unit 6, printer 8, and display (omitted from illustration).

Figure 14:
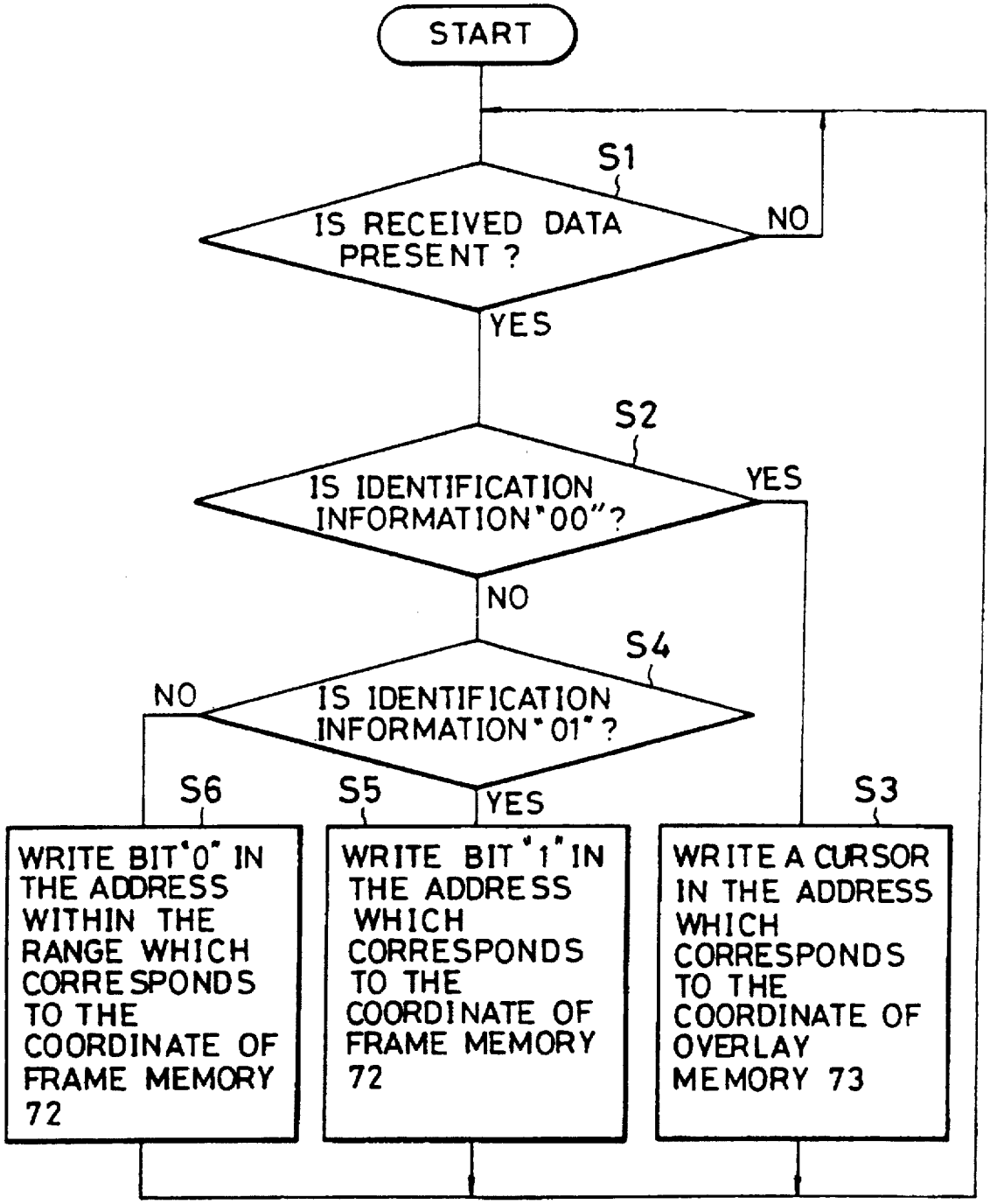
FIG. 14 is a flow chart for processing of image information performed by the data processing unit.

FIG. 14 is a flow chart of the program relating to processing of image information in the data processing unit 7. Image information processing means is formed by this program and the microprocessor 71.

The operation of the data processing unit 7 will now be described.

The microprocessor 71 receives data comprising the x and y-coordinates and the identification information from the sensing portion control unit 6 via the interface circuit 75 (step s1), and determines whether or not the thus-received information is "00" (step s2).

If the identification information is "00", the microprocessor 71 determines that the coordinates at this time are temporal positional data, and causes the character generator (omitted from illustration) to generate a cursor pattern ,for example, an arrow "↑" as to be written in an address in the overlay memory 73 which corresponds to the above-described coordinates (step s3). Since the contents of the overlay memory 73 can be lost if no data is written within a predetermined time period (usually several ms), the above-described address in which the cursor has been written is changed in accordance with the change of the coordinates transmitted from the sensing portion control unit 6.

If the identification information is not "00", it is determined whether or not the same is "01" (step s4). If the identification information is "01", it is determined that the data corresponds to the image drawn on the writing surface 14 by the marker 3 so that bit "1" is written in the address in the frame memory 72 corresponding to the above-described coordinates (step s5). Contents written in the frame memory 72 can be retained if no other data is written therein.

If the identification information is neither "00" nor "01", it is determined that the data is the data for determining a predetermined range on the writing surface 14 to be erased by the eraser 4 so that bit "0" is written in the address in the frame memory 72 corresponding to the predetermined range to be erased and determined by the above-described coordinates (step s6), and the image information is deleted.

When a printing-out switch (omitted from illustration) of the above-described operation switches 51 is operated, the microprocessor 71 transmits the contents of the frame memory 73 to the printer 8 via the interface circuit 76 so that these contents are subjected to a hard copying process.

When a display device is connected, the microprocessor 71 simultaneously reads out the contents of the frame memory 72 and the overlay memory 73 via the interface circuit 77 and simultaneously converts the contents to a video signal as to be transmitted to and displayed on the display device.

When the marker 3 or the eraser 4 is used along the writing surface 14, the contents of the frame memory 72 are rewritten in accordance with the coordinates at that time. When the instruction rod 2 is used on the writing surface 14, or when the marker 3 is used such that the same does not come contact with the writing surface 14, the cursor is written in the overlay memory 73 in accordance with the coordinates at that time. Therefore, image corresponding to the image written on the writing surface 14 is displayed by dots on the frame of the display device, and the position of the instruction rod 2 or the marker 3 pointing an optional position on the writing surface 14 is indicated by the cursor.

Furthermore, data received from the sensing portion control unit 6 can be transmitted to the other electronic blackboard connected by means of an interface circuit, a MODEM and communication lines for the purpose of display the similar image or cursor on the display device of the other electronic blackboard.

As an alternative to the above-described embodiment in which only one type of marker comprising a black felt pen is used, a multiplicity of markers comprising the other color felt pens, for example, red, blue and so on and tuning circuits each of which having individual frequencies may be prepared, these markers being identified from the above-described identification information as to be processed on frame memories corresponding to the multiplicity of colors.

Figure 15:
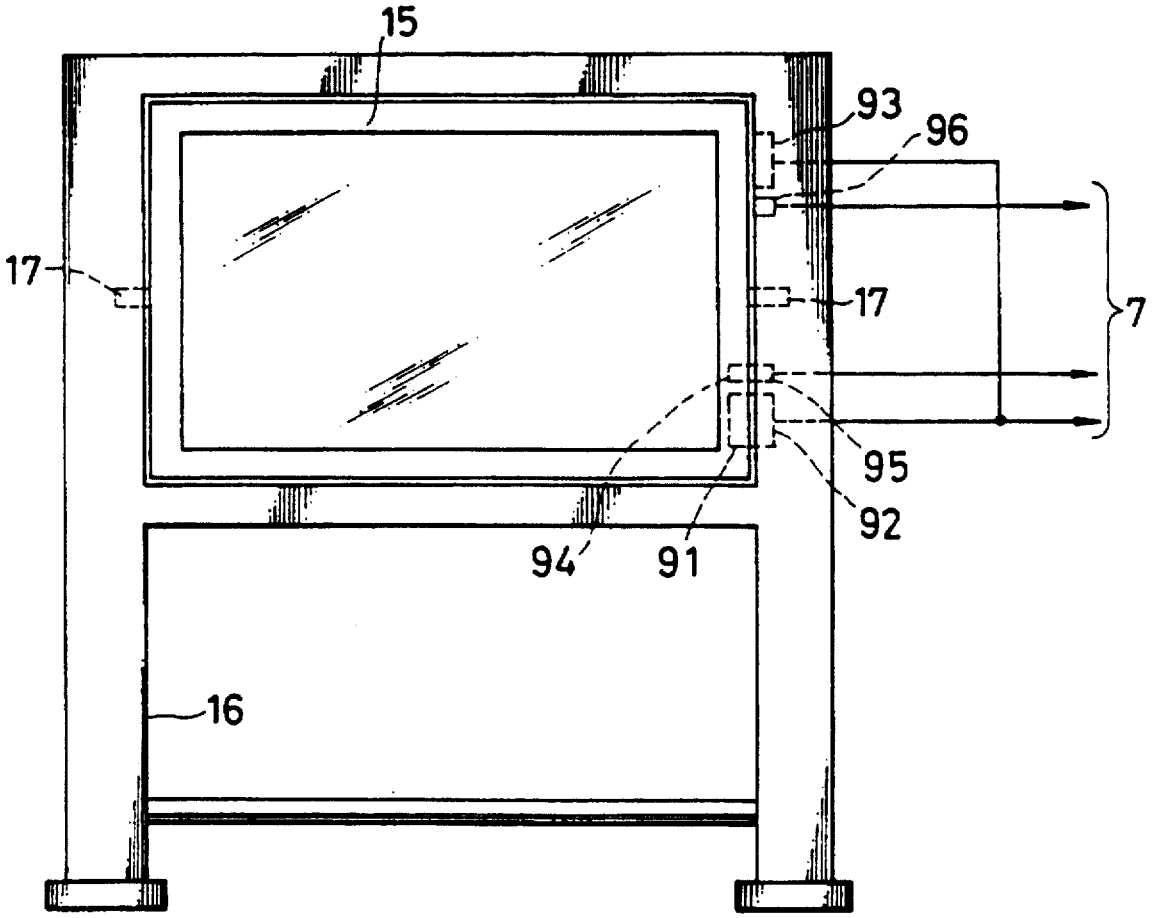
FIG. 15 is a view of a second embodiment of the electronic blackboard apparatus according to the present invention.

FIG. 15 is a diagram of a second embodiment of the electronic blackboard according to the present invention, in which an example of a structure in which two writing surfaces are provided is illustrated. Referring to this drawing, reference numeral 15 represents a frame supported as to be rotatable with respect to the legs 16 with a support shaft 17. Each of the obverse side and the reverse side of this frame 15 can be optionally made face the direction of the surface of this drawing sheet.

Figure 16:
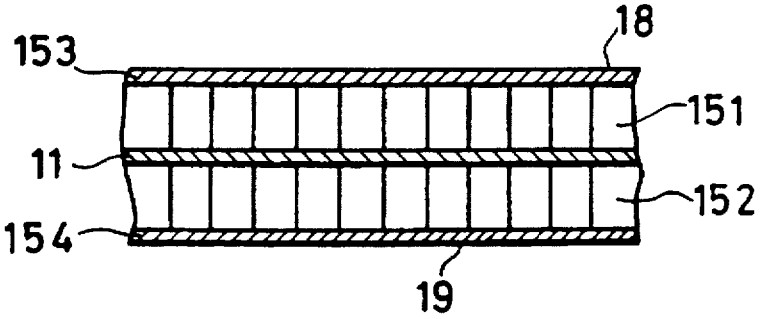
FIG. 16 is a view of a partial cross-sectional view of a frame according to the second embodiment.

The frame 15 is, as shown in FIG. 16, provided with, on both sides of the sensing portion 11 thereof, honeycomb members 151 and 152 made of a non-metallic material such as a synthetic resin or the like, and boards 153 and 154 which are similarly made of a non-metallic material are disposed on both sides of the above-described honeycomb members 151 and 152. The boards 153 and 154 respectively have corresponding writing surfaces 18 and 19 which can be repeatedly used.

The frame 15 and the legs 16 respectively includes couplers 91, 92, and 93 for the purpose of transmitting information therebetween. These couplers 91 to 93 are arranged such that when either of the two writing surfaces, for example, the writing surface 18 is made face the surface of this drawing sheet, the couplers 91 and 92 confront each other, while when the other one, that is, the writing surface 19 is made face the surface of this drawing sheet, the couplers 91 and 93 confront each other.

These couplers 91 to 93 include, for example, light emitting diodes or phototransistors for the purpose of transmitting information by means of optical signals. According to this embodiment, the sensing portion control unit 6 is disposed within the frame 15 (for example, in the circumferential portion of the sensing portion 11) so that information to be transmitted by means of the couplers 91 to 93 becomes the above-described coordinates or identification information.

A metallic member 94 and non-contact sensors 95 and 96 are respectively disposed adjacent to the above-described positions at which the couplers 91 to 93 are positioned in the frame 15 and the legs 16 so that when the writing surface 18 is made face the surface of this drawing sheet, the metallic member 94 and the non-contact sensor 95 confront each other, while when the other one, that is, the writing surface 19 is made face the surface of this drawing sheet, the metallic member 94 and the non-contact sensor 96 confront each other so that detection of the fact which one of the writing surfaces 18 and 19 is being positioned to face the surface of this drawing sheet can be readily performed, that is, a fact that which one is being used can be readily detected. The outputs from the non-contact sensors 95 and 96 are transmitted to the data processing unit 7 via an interface circuit (omitted from illustration).

The power for the sensing portion control unit 6 in the frame 16 is arranged to be supplied through a mechanical and electric contact (omitted from illustration) disposed similarly to the couplers 91 to 93.

According to the above-described apparatus, the vertical positions of the sensing portions 11 are made inverse between the case in which the writing surface 18 is made to face the surface of this drawing sheet and the case in which the writing surface 19 is made to face the same. Therefore, even if the same image has been written, coordinates whose vertical positions are different are output from the sensing portion control unit 6.

Figure 17:
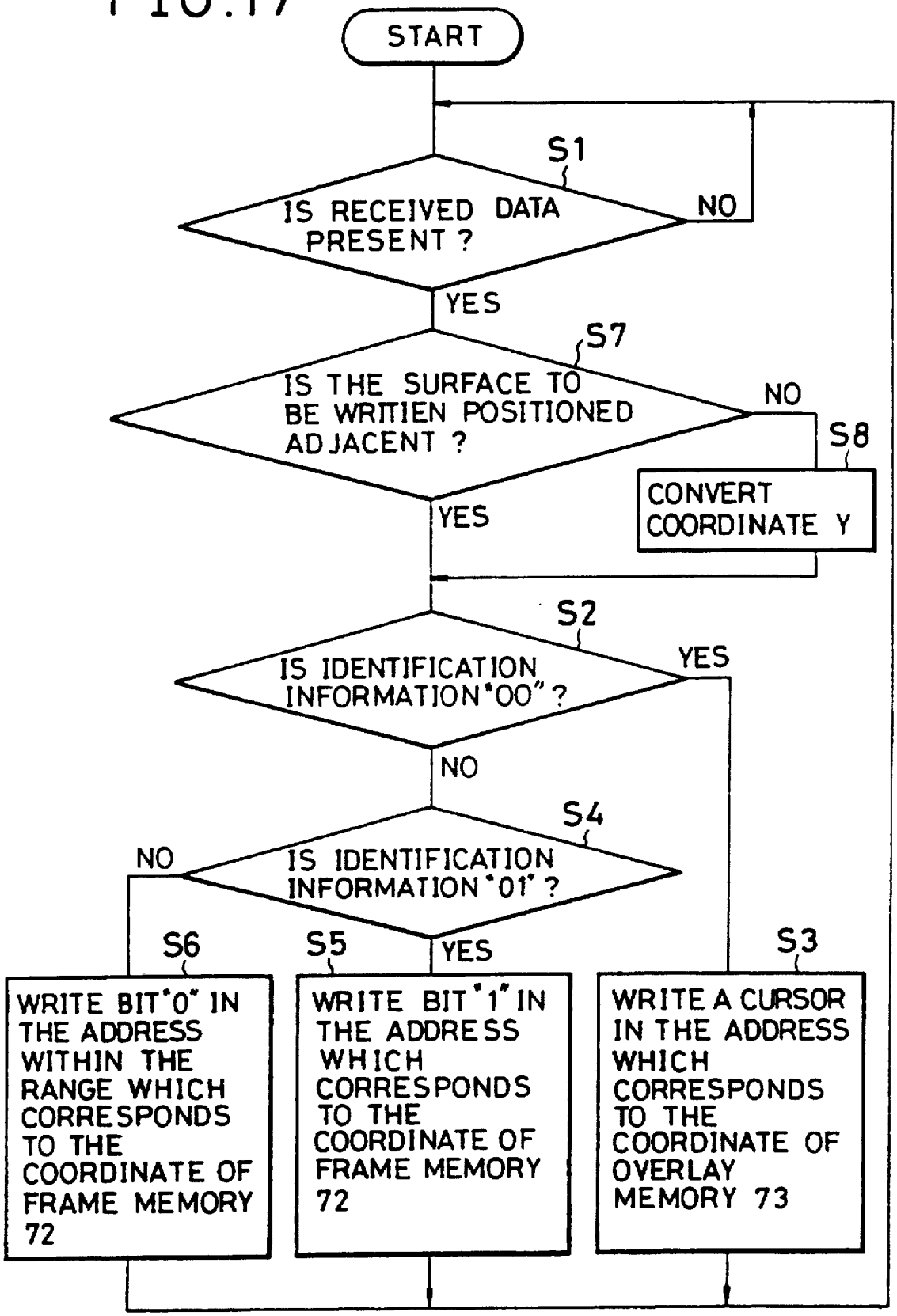
FIG. 17 is a flow chart of a program for the data processing unit according to the second embodiment.

FIG. 17 is a flow chart of a program employed in the data processing unit 7 according to the present invention. When data from the sensing portion control unit 6 is received, a fact that which one of the writing surface of the frame 15 faces the surface of this drawing sheet is detected on the basis of the outputs from the non-contact sensors 95 and 96 (step s7) and the vertical coordinate, for example, y-coordinate is used intact or is converted into a value obtained by subtracting this coordinate from the maximal value in the subject direction (step s8). Therefore, according to the present invention, both of the writing surfaces can be used in the same manner regardless of consciousness of recognizing the writing surface.

According to this embodiment, the metallic member 94 and the non-contact sensor 95 and 96 form means for detecting the writing surface which is being used, while, the program and microprocessor 71 shown in FIG. 17 form coordinate conversion means.

The sensing portion described in the first and second embodiments is usually formed by an insulating substrate having a printed conductive pattern as to correspond to the positions of the above-described x and y-direction loop coils. Alternatively, a structure may be employed which is arranged such that a member in which a multiplicity of conductive wires are, at predetermined intervals, held between two insulating films and the thus-held conductive wires are connected to each other so as to correspond to the positions of the x and y-direction loop coils.

The most preferable example is described upon the electronic blackboard apparatus according to the present invention. For example, the loop coil for generating the electric wave and the loop coil for detecting the electric wave may be individually provided. In this case, the structure may be arranged to always generate the electric wave.

Although the structure of the above-described embodiments is arranged in such a manner that one sensing portion performs both the transmission function and receiving function, a structure may be formed such that a transmitting sensing portion and a receiving sensing portion may be individually provided. It is not necessarily critical for the transmission and the reception to be subjected to the time-division treatment. For example, a structure may be arranged such that the transmission side continues the transmission and the reception side detects a predetermined electric wave from the transmission side by switching only the coils of the tuning circuit.

In the foregoing, the present invention may be subject to various arrangements, modifications and detailed changes in range that they do not deviate from the spirit. Therefore, the invention should not be understood within the limited meanings without adhering to the disclosed embodiment in the specification and drawings. The present invention is in the scope of the claims and further protected in the range that it agrees with the spirit.

What is claimed is:

1. An electronic blackboard apparatus comprising:

a writing surface, a tool for modifying an image on the surface including a tuned circuit having a predetermined resonant frequency;

means for sensing the presence of the tool relative to said surface, said means including electric wave generating means for generating an electric wave with plural frequencies, one of which is resonant to said frequency, and an electric wave detection means for detecting an electric wave reflected by said tuned circuit;

said sensing means including coordinate detection means responsive to the electric wave reflected from said tool and generated by said generating means for detecting a coordinate corresponding to the position of said tool; and image information processing means for processing, on the basis of the thus-detected coordinate, image information corresponding to an image formed by the tool on the surface.

2. An electronic blackboard apparatus according to claim 1, wherein said electric wave generating means and said electric wave detection means are arranged to be alternately operated.

3. An electronic blackboard apparatus according to claim 1 or 2, wherein said electric wave generating means and said electric wave detection means include x and y-direction loop coil groups.

4. An electronic blackboard apparatus according to claim 1 or 2 further wherein a plurality of said tools are provided, each of said tools having a tuned circuit with a different resonant frequency, equal to frequencies of the plural frequencies of the generated electric waves;

the coordinate detection means detecting the different resonant frequencies;

writing tool identification means for generating identification information expressing, on the basis of the detected frequency a characteristic of said tool which is being used on said sensing portion; and image information processing means for processing image information which corresponds to the image on said writing surface on the basis of the detected coordinates of said tool and identification information expressing the characteristic of said tool which is being used.

5. An electronic blackboard apparatus according to claim 1 or 2 wherein:

a pair of said writing surfaces are disposed on opposite sides of said means for sensing, said writing surfaces being capable of being used repeatedly;

means for detecting the surface which is being used for detecting the writing surface which is being used; and coordinate conversion means for deriving indications in two coordinate directions of said tool as derived from said coordinate detection means.

6. The apparatus of claim 5 wherein the two coordinate directions are in the x and y directions.

7. The apparatus of claim 5 wherein the coordinate conversion means derives the indications intact.

8. The apparatus of claim 5 wherein the coordinate conversion means derives the indications intact after the coordinates have been converted on the basis of the writing surface which is being used.

9. In combination, a position sensing tablet; a two coordinate, direction coil arrangement associated with the tablet; a tool means adapted to be moved relative to the tablet and coil arrangement, the tool means including tuned circuits having first and second resonant frequencies; means for supplying AC energy at the first and second resonant frequencies to the coil arrangement; the tuned circuits on the tool means when the tool means is placed in proximity to the tablet and coil arrangement respectively causing changes in currents flowing in the coil arrangement of said first and second frequencies; and means for sensing the changes in the current flowing in the coil arrangement at said first and second frequencies and responding to the current changes at said first and second frequencies for deriving a signal indicative of coordinates of the tool means relative to the tablet and coil means.

10. The combination of claim 9 wherein the energy at the different frequencies is sequentially supplied to different coils of the coil arrangement.

11. The combination of claim 10 wherein the change is detected by supplying each of the coils during a first interval with the AC energy at one of the predetermined frequencies, the means for sensing being activated to be responsive to energy coupled back to each of the coils from the tuned circuit during a second interval while the particular coil is not supplied with the AC energy at the one predetermined frequency.

12. The combination of claim 9 wherein said tool means is cordless and no electric power supply is connected to the tuned circuits thereof.

13. The combination of claim 9 wherein the signal is further indicative of first and second characteristics of the tool means respectively associated with the first and second frequencies.

14. In combination, a position sensing tablet; a two coordinate, direction coil arrangement associated with the tablet; a two coordinate direction display superposed with the tablet; a marker for the display; an eraser for the display; the marker including a tuned circuit having a first resonant frequency; the eraser including a tuned circuit having a second resonant frequency; means for supplying AC energy at the first and second resonant frequencies to the coil arrangement; the tuned circuits on the marker and the eraser when the marker is placed in proximity to the tablet and coil arrangement respectively causing changes in currents flowing in the coil arrangement of said first and second frequencies; and means for sensing the changes in the current flowing in the coil arrangement at said first and second frequencies and responding to the current changes at said first and second frequencies for denying a signal indicative of the position of marking by the marker on the display as modified by the eraser.

15. The combination of claim 14 wherein the energy at the different frequencies is sequentially supplied to different coils of the coils arrangement.

16. The combination of claim 15 wherein the change is detected by supplying each of the coils during a first interval with the AC energy at one of the predetermined frequencies, the means for sensing being activated to be responsive to energy coupled back to each of the coils from the tuned circuit during a second interval while the particular coil is not supplied with the AC energy at the one predetermined frequency.

17. The combination of claim 16 further including another two coordinate display responsive to the signal indicative of the position of the modified markings for displaying the modified markings.

18. The combination of claim 17 further including a plurality of said markers, each of said markers being for a different color and including a tuned circuit with a different resonant frequency, the means for supplying feeding AC energy at each of the resonant frequencies to the coil, the means for sensing responding to change sin the current flowing in said coil at each of the resonant frequencies, said another display displaying the position and colors of markings made by each of said markers.

19. The combination of claim 16 wherein the means for supplying supplies different frequencies in sequence to the coil arrangement such that in response to the marker having the first resonant frequency being proximate to and not being proximate the tablet the means for supplying respectively derives said first resonant frequency for first and second durations prior to deriving a second frequency, said first duration being considerably in excess of said second duration.

20. The combination of claim 19 wherein each of the first durations is divided into a plurality of said first and second intervals.

21. The combination of claim 14 further including another two coordinate display responsive to the signal indicative of the position of the modified markings for displaying the modified markings.

22. The combination of claim 21 further including a plurality of said markers, each of said markers being for a different color and including a tuned circuit with a different resonant frequency, the means for supplying feeding AC energy at each of the resonant frequencies to the coil, the means for sensing responding to changes in the current flowing in said coil at each of the resonant frequencies, said another display displaying the position and colors of markings made by each of said markers.

23. The combination of claim 14, wherein said marker and eraser are cordless and no electric power supply is connected to the tuned circuits thereof.

24. In combination, a position sensing tablet; a two coordinate direction coil arrangement associated with the tablet; multiple implements for movement relative to the tablet, each of said implements having a different characteristic associated therewith and including a tuned circuit having a different resonant frequency; means for supplying AC energy at the different resonant frequencies to the coil arrangement; the tuned circuits on the implements when the implements are placed in proximity to the tablet and coil arrangement causing changes in the currents flowing in the coil arrangement at said different frequencies; and means for sensing changes in current flowing in the coil arrangement at said different frequencies and responsive to the current changes at said frequencies for deriving a signal indicative of the position and characteristics of the implements relative to the tablet.

25. The combination of claim 24 wherein the energy at the different frequencies is sequentially supplied to coils of the coil arrangement.

26. The combination of claim 25 wherein the change is detected by supplying each of the coils during a first interval with the AC energy at one of the different frequencies, the means for sensing being activated to be responsive to energy coupled back to each of the coils from the tuned circuit during a second interval while the particular coil is not supplied with the AC energy at the one frequency.

27. The combination of claim 26 wherein the means for supplying supplies different frequencies in sequence to the coil arrangement such that in response to an implement having a first resonant frequency being proximate to and not being proximate to the tablet the means for supplying respectively derives said first resonant frequency for first and second durations prior to deriving a second frequency, said first duration being considerably in excess of said second duration.

28. The combination of claim 27 wherein each of the first durations is divided into a plurality of said first and second intervals.

29. Apparatus for identifying a characteristic and position of an implement having one of plural characteristics, the implement including a tuned circuit having one of plural different resonant frequencies, comprising a position sensing tablet; a two coordinate direction coil arrangement associated with the tablet; means for supplying AC energy at the plural different resonant frequencies to the coil arrangement; the tuned circuit on the implement when placed in proximity to the tablet and coil arrangement causing changes in current flowing in the coil arrangement at said one frequency; means for sensing changes in the current flowing in the coil arrangement at said different frequencies and responsive to the current changes at said frequencies for deriving a signal indicative of the position and characteristic of the implement on the tablet.

30. The combination of claim 29 wherein the energy at the different frequencies is sequentially supplied to coils of the coil arrangement.

31. The combination of claim 30 wherein the change is detected by supplying each of the coils during a first interval with the AC energy at one of the predetermined frequencies, the means for sensing being activated to be responsive to energy coupled back to each of the coils from the tuned circuit during a second interval while the particular coil is not supplied with the AC energy at the one predetermined frequency.

32. The combination of claim 31 wherein the means for supplying supplies different frequencies in sequence to the coil arrangement such that in response to an implement having a first resonant frequency being proximate to and not being proximate the tablet the means for supplying respectively derives said first resonant frequency for first and second durations prior to deriving a second frequency, said first duration being considerably in excess of said second duration.

33. The combination of claim 32 wherein each of the first durations is divided into a plurality of said first and second intervals.

34. The apparatus of claim 29 further including a two-coordinate direction display superposed with the tablet adapted to be marked by the implement.

35. The apparatus of claim 34 further including another two-coordinate direction display responsive to the signal for displaying the position and characteristics of the implement on the tablet.

36. The apparatus of claim 29 further including a two-coordinate direction display responsive to the signal for displaying the position and characteristics of the implement on the tablet.

37. A method of identifying a characteristic and position of an implement on a position sensing tablet having a two coordinate direction coil arrangement associated therewith, the implement having one of plural characteristics and including a tuned circuit having one of plural different resonant frequencies, comprising supplying AC energy at the plural different resonant frequencies to the coil arrangement; the tuned circuit on the implement when placed in proximity to the tablet and coil arrangement causing changes in current flowing in the coil arrangement at said one frequency; sensing changes in the current flowing in the coil arrangement at said different frequencies and responding to current changes at said frequencies for deriving a signal indicative of the position and characteristic of the implement on the tablet.

38. The method of claim 37 wherein the energy at the different frequencies is sequentially supplied to coils of the coil arrangement.

39. The method of claim 38 wherein the change is detected by supplying each of the coils during a first interval with the AC energy at one of the predetermined frequencies, sensing energy coupled back to one of the coils from the tuned circuit during a second interval while the particular coil is not supplied with the AC energy at the one predetermined frequency.

40. The method of claim 39 wherein the different frequencies are supplied in sequence to the coil arrangement such that in response to an implement having a first resonant frequency being on and not being on the tablet the first frequency is respectively derived for first and second durations prior to deriving a second frequency, said first duration being considerably in excess of said second duration.

41. The method of claim 40 wherein each of the first durations is divided into a plurality of said first and second intervals.

42. An eraser for supplying a signal to an electronic display and for removing a marking from a surface of a visual display comprising a housing, the housing including: a surface for erasing the marking, first and second tuned circuits each having a reactance positioned in proximity to first and second opposite edges of the erasing surface, first and second switches which when activated respectively cause the first and second tuned circuits to have different first and second resonant frequencies, the first and second switches being positioned and arranged so that the first switch is activated in response to the first edge of the eraser being pushed against the display surface and the second switch is activated in response to the second edge of the eraser being pushed against the display surface.

43. The eraser of claim 42 wherein the eraser is cordless and not electric power supply is connected to the tuned circuits.

44. In combination, a position sensing tablet; a two coordinate direction coil arrangement associated with the tablet: a two-coordinate direction display superposed with the tablet; multiple implements for modifying markings on the display, each of said implements having a different characteristic associated therewith and including a tuned circuit having a different resonant frequency for each characteristic; means for supplying AC energy at the different resonant frequencies to the coil arrangement; the tuned circuit on the implements when the implements are placed in proximity to the tablet and coil arrangement respectively causing changes in the currents flowing in the coil arrangement at said different frequencies; and means for sensing changes in the current flowing in the coil arrangement at said different frequencies and responsive to current changes at said frequencies for deriving a signal indicative of the position and characteristics of markings by the implements on the display.

45. The combination of claim 44 wherein the energy at the different frequencies is sequentially supplied to different coils of the coil arrangement.

46. The combination of claim 45 wherein the changes are detected by supplying each of the coils during a first interval with the AC energy at one of the predetermined frequencies, the means for sensing being activated to be responsive to energy coupled back to one of the coils from the tuned circuit during a second interval while the particular coil is not supplied with the AC energy at the one predetermined frequency.

47. The combination of claim 46 further including another two coordinate display responsive to the signal indicative of the position of the markings and the identification of the implements.

48. The combination of claim 47 wherein the implements include a plurality of markers, each of said markers being for a different color, said another display displaying the position and colors of the markings made by each of the markers on the first named display.

49. The combination of claim 44 further including another two coordinate display responsive to the signal indicative of the position of the marking and the characteristics of the implements.

50. The combination of claim 49 wherein the implements include a plurality of markers, each of said markers being for a different color, said another display displaying the position and colors of the markings made by each of the markers on the first named display.

51. The combination of claim 44 wherein each of said implements is cordless and no electric power supply is connected to the tuned circuits thereof.

52. The combination of claim 50 wherein one of the implements is a marker and another of the implements is an eraser for markings of the marker, said signal being indicative of markings by the marker as modified by the eraser, the another display being responsive to the signal to indicate the markings as modified by the eraser.

53. The combination of claim 52 wherein the implements include a plurality of markers, each of said markers being for a different color, said another display displaying the position and colors of the markings made by each of the markers on the first named display.

54. In combination, a position sensing tablet; a two coordinate coil arrangement associated with the tablet; a two coordinate direction display superposed with the tablet; plural markers for the display, each of the markers being for a different color on the display; each of the markers including a tuned circuit having a different resonant frequency, means for supplying AC energy at the different resonant frequencies to the coil arrangement, the tuned circuits on the markers when the markers are placed in proximity to the tablet and coil arrangement causing changes in currents flowing in coils of the coil arrangement at said different frequencies; and means responsive to energy coupled between the tablet and markers for deriving a signal indicative of the position of the colors of markings by the markers on the display, said last named means sensing changes in current flowing in the coil arrangement at said different frequencies.

55. The combination of claim 54 wherein the energy at the different frequencies is sequentially supplied to different coils of the coil arrangement.

56. The combination of claim 55 wherein the change is detected by supplying each of the coils during a first interval with the AC energy at one of the predetermined frequencies, the means for sensing being activated to be responsive to energy coupled back to one of the coils from the tuned circuit during a second interval while the particular coil is not supplied with the AC energy at the one predetermined frequency.

57. The combination of claim 56 further including another two coordinate color-display responsive to the signal indicative of the position of markings for displaying the position and color of the markings.

58. The combination of claim 54 further including another two coordinate color-display responsive to the signal indicative of the position of markings for displaying the position and color of the markings.

59. The combination of claim 54 wherein said markers are cordless and no electric power supply is connected to the tuned circuits thereof.

60. A method of displaying a polychromic image comprising marking a first two coordinate direction display with plural markers each having a different color and a tuned circuit with a different resonant frequency thereon, applying plural frequencies to a two coordinate direction coil arrangement, the coil arrangement coupling the plural frequencies to each marker as it is marking the first display, activating the coil arrangement so it is responsive to an interaction of each applied frequency and each tuned circuit to provide an indication of the color and position of the mark being made by each marker on the first display, and displaying on a second two coordinate direction display the position and color of the mark made by each marker on the first display by responding to the indication.

61. The method of claim 60 wherein each of the frequencies is sequentially applied to the markers on the display.

62. The method of claim 61 wherein the frequencies are applied during a first interval and the response to the interaction is derived during a second interval while the frequencies are not applied.

63. The method of claim 62 wherein the different frequencies are supplied in sequence to the coil arrangement such that in response to an implement having a first resonant frequency being on and not being on the tablet said first resonant frequency is respectively derived for first and second durations prior to deriving a second frequency, said first duration being considerably in excess of said second duration.

64. The method of claim 63 wherein each of the first durations is divided into a plurality of said first and second intervals.

65. A method of indicating the position of an image on a two coordinate direction display, comprising marking the display with a marker, erasing from the display at least a portion of marks made by the marker, said marker and eraser respectively having tuned circuits with first and second resonant frequencies, activating a two coordinate direction coil arrangement so it applies said first and second resonant frequencies to the marker and the eraser as they respectively mark and erase the display, and activating the coil arrangement to be responsive to an interaction of the applied first and second frequencies with the tuned circuits to derive an indication of the position of the marking on the display as modified by the eraser.

66. The method of claim 65 further comprising displaying the position of the marking on the display as modified by the eraser by applying the indication to another two coordinate direction display.

67. The method of claim 66 wherein each of the frequencies is sequentially applied to the markers on the display.

68. The method of claim 67 wherein the frequencies are applied during a first interval and the response to the interaction is derived during a second interval while the frequencies are not applied.

69. The method of claim 68 wherein the different frequencies are supplied in sequence to the coil arrangement such that in response to an implement having a first resonant frequency being on and not being on the tablet, said first resonant frequency is respectively derived for first and second durations prior to deriving a second frequency, said first duration being considered in excess of said second duration.

70. The method of claim 69 wherein each of the first durations is divided into a plurality of said first and second intervals.

71. The method of claim 65 wherein each of the frequencies is sequentially applied to the markers on the display.

72. The method of claim 71 wherein the frequencies are applied during a first interval and a response to the interaction is derived during a second interval while the frequencies are not applied.

73. The method of claim 72 wherein the different frequencies are supplied in sequence to the coil arrangement such that in response to an implement having a first resonant frequency being on and not being on the tablet said resonant frequency is respectively derived for first and second durations prior to deriving a second frequency, said first duration being considered in excess of said second duration.

74. An eraser for supplying a signal to an electronic display and for removing a marking from a surface of a visual display comprising a housing, the housing including: a surface for erasing the marking, a tuned circuit having a reactance positioned immediately behind the eraser surface, and switch means activated in response to the erasing surface being pressed against the display surface for connecting elements of the tuned circuit, including said reactance, together so they have a predetermined resonant frequency while the erasing surface is pressed against the display surface.

75. The eraser of claim 74 wherein the switch means includes first and second switches positioned and arranged so that the first switch is activated in response to a first edge of the eraser being pushed against the display surface and the second switch is activated in response to a second edge of the eraser, opposite the first edge, being pushed against the display surface.

76. The eraser of claim 74 wherein the eraser is cordless and no electric power supply is connected to the tuned circuit.

77. The eraser of claim 74 wherein the reactance includes a coil having a longitudinal axis at a right angle relative to the erasing surface.

78. In combination, a position sensing tablet; a two coordinate direction coil arrangement associated with the tablet; a two coordinate direction display; a first implement for causing marks to appear on the display; a second implement for causing marks to be erased from the display; the first implement including a tuned circuit having a first resonant frequency; the second implement including a tuned circuit having a second resonant frequency; means for supplying AC energy at the first and second resonant frequencies to the coil arrangement; the implements are placed in proximity to the tablet and coil arrangement respectively causing changes in currents flowing in the coil arrangement of said first and second frequencies; and means for sensing the changes in the current flowing in the coil arrangement at said first and second frequencies and responding to the current changes at said first and second frequencies for deriving a signal indicative of the position of markings by the first implement on the display as modified by the second implement.

79. The combination of claim 78 wherein the display is superposed with the tablet, the first implement and second implement being adapted to bear on the display.

80. The combination of claim 78 wherein the display is remote from the tablet and is responsive to the signal to indicate the position of the markings as modified by the second implement.

81. In combination, a position sensing tablet; a two coordinate direction coil arrangement associated with the tablet; multiple implements adapted to be moved relative to the tablet, each of said implements having a different characteristic associated therewith and including a tuned circuit having a different resonant frequency for each characteristic; means for supplying AC energy at the different resonant frequencies to the coil arrangement; the tuned circuits on the implements when the implements are placed in proximity to the tablet and coil arrangement respectively causing changes in the currents flowing in the coil arrangement at said different frequencies; and means for sensing changes in the current flowing in the coil arrangement at said different frequencies and responsive to current changes at said frequencies for deriving a signal indicative of the position of the implements relative to the tablet and of the characteristics of the implements.

82. In combination, a position sensing tablet; a two coordinate coil arrangement associated with the tablet; a two coordinate direction display; implement means for the display, said implement means including plural tuned circuits each having a different resonant frequency, a different resonant frequency being assigned to a different color for the display, means for supplying AC energy at the different resonant frequencies to the coil arrangement, the coil arrangement interacting with the tuned circuits on the implement means when the implement means is placed in proximity to the tablet to cause changes in currents flowing in coils of the coil arrangement at said different frequencies; and means responsive to energy coupled between the tablet and the tuned circuits for deriving a signal indicative of the position of the colors of marks on the display resulting from the different tuned circuits being positioned relative to the tablet, said last named means sensing changes in current flowing in the coil arrangement at said different frequencies.

83. A method of displaying a polychromic image comprising moving implement means having tuned circuit means with resonant frequencies, each associated with a different color, relative to a tablet having a two coordinate direction coil arrangement; applying plural frequencies to the two coordinate direction coil arrangement, the coil arrangement coupling the plural frequencies to the implement means as it is moved relative to the tablet; activating the coil arrangement so it is responsive to an interaction of each applied frequency and each tuned circuit resonant frequency to provide an indication of the position and color assigned to the resonant frequency of the implement means relative to the tablet, and displaying on a two coordinate direction display the position and color associated with the movement of the implement means relative to the tablet by responding to the indication.

84. A method of indicating the position of the effective movement of a first implement that causes marks to appear on a two coordinate direction display, the effective movement of the first implement being modified by a second implement that causes the marks to be erased from the display, comprising moving the first and second implements relative to a tablet so that some of the area traversed by the first implement relative to the tablet is subsequently traversed by the second implement, said first and second implements respectively having tuned circuits with first and second resonant frequencies, activating a two coordinate direction coil arrangement of the tablet so it applies said first and second resonant frequencies to the first and second implements as they are respectively traversed relative to the tablet, and activating the coil arrangement to be responsive to an interaction of the applied first and second frequencies with the tuned circuits to derive an indication of the position of the marks on the display as modified by the erasing action of the second implement.

85. An electronic blackboard apparatus according to claim 4 wherein:

a pair of said writing surfaces are disposed on opposite sides of said means for sensing, said writing surfaces being capable of being used repeatedly;

means for detecting the surface which is being used for detecting the writing surface which is being used; and coordinate conversion means for deriving indications in two coordinate directions of said tool as derived from said coordinate detection means.

*86. An electronic writing tablet apparatus comprising:*

*a writing surface,*

*a tool for modifying an image on the surface including a tuned circuit having a resonant frequency;*

*means for sensing the presence of the tool relative to said writing surface, said means including electric wave generating means for generating an electric wave with plural frequency components, one having a value equal to said resonant frequency, and an electric wave detection means for detecting an electric wave reflected by said tuned circuit;*

*said sensing means including coordinate detection means responsive to the electric wave reflected from said tool and generated by said generating means for detecting a coordinate corresponding to the position of said tool.*

*87. The electronic tablet apparatus of claim 86 wherein said electric wave generating means and said electric wave detection means include x- and y-direction loop coil groups.*

*88. In combination, a position sensing tablet; a two coordinate direction coil arrangement associated with the tablet; a tool means adapted to be moved relative to the tablet and coil arrangement, the tool means including tuned circuit means having first and second resonant frequencies; means for supplying AC energy having first and second frequency components to the coil arrangement; the tuned circuit means on the tool means when the tool means is placed in proximity to the tablet and coil arrangement causing a change in a current flowing in the coil arrangement, and means for sensing the change in the current flowing in the coil arrangement and responding to the current change for deriving a signal indicative of coordinates of the tool means relative to the tablet and coil means.*

*89. The combination of claim 88 wherein said tool means is cordless and no electric power supply is connected to the tuned circuit means thereof.*

*90. The combination of claim 88 wherein the first and second frequency components are respectively equal to the first and second resonant frequencies.*

* * * * *